US010063751B2

United States Patent
Hamsici et al.

(10) Patent No.: US 10,063,751 B2
(45) Date of Patent: Aug. 28, 2018

(54) SYSTEM AND METHOD FOR ACCESSING IMAGES WITH A CAPTURED QUERY IMAGE

(71) Applicant: QUALCOMM Incorporated, San Diego, CA (US)

(72) Inventors: Onur Canturk Hamsici, Cupertino, CA (US); Vijayalakshmi Rajasundaram Raveendran, San Diego, CA (US); Lochan Verma, San Diego, CA (US); Anuraag Sridhar, Holsworthy (AU); Jesus Manuel Dominguez, San Diego, CA (US); Mina Ayman Saleh Yanni Makar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/864,703

(22) Filed: Sep. 24, 2015

(65) Prior Publication Data

US 2017/0094133 A1 Mar. 30, 2017

(51) Int. Cl.
*H04N 5/225* (2006.01)
*G06F 1/16* (2006.01)
(Continued)

(52) U.S. Cl.
CPC ........... *H04N 5/225* (2013.01); *G06F 1/1632* (2013.01); *G06F 13/4068* (2013.01); *G06F 17/30244* (2013.01)

(58) Field of Classification Search
CPC .... H04N 5/225; G06F 13/4068; G06F 1/1632
See application file for complete search history.

(56) References Cited

U.S. PATENT DOCUMENTS 7,860,317 B2 12/2010 Xie et al.
8,254,697 B2 * 8/2012 Isard ................. G06F 17/30247
362/195

(Continued)

FOREIGN PATENT DOCUMENTS

EP 1914680 A1 4/2008
WO 2007021996 A2 2/2007
WO 2014189657 A1 11/2014

OTHER PUBLICATIONS

Yang, et al., "Mobile Image Search with Multimodal Context-Aware Queries," IEEE, Jun. 13-18, 2010, pp. 25-32.
(Continued)

*Primary Examiner* — Gevell Selby
(74) *Attorney, Agent, or Firm* — Shumaker & Sieffert, P.A.

(57) ABSTRACT

In one example, a system and method includes acquiring, by a wireless dockee (WD), an image, initiating a wireless connection between the wireless dockee (WD) and a wireless docking center (WDC) having one or more peripherals, determining attributes associated with the acquired image, wherein the attributes include feature descriptors, receiving, at the WD and from the WDC, information representative of matching items stored on one or more of the peripherals, wherein the matching items include images with attributes similar to the attributes associated with the acquired image, selecting, at the WD and as a function of the information representative of the matching items, one or more of the matching items, and receiving, from the one or more of the peripherals, the selected matching items.

26 Claims, 11 Drawing Sheets

(51) Int. Cl.
*G06F 13/40* (2006.01)
*G06F 17/30* (2006.01)

(56) References Cited

U.S. PATENT DOCUMENTS

| | | | |
|---|---|---|---|
| 8,391,615 B2 | 3/2013 | Wu et al. | |
| 8,687,104 B2 * | 4/2014 | Penov | G06K 9/6202 348/222.1 |
| 2005/0162523 A1 * | 7/2005 | Darrell | G06F 17/30864 348/211.2 |
| 2006/0227992 A1 * | 10/2006 | Rathus | G06F 17/30247 382/100 |
| 2010/0260426 A1 | 10/2010 | Huang et al. | |
| 2012/0323930 A1 | 12/2012 | Kennberg et al. | |
| 2013/0163814 A1 * | 6/2013 | Takiguchi | G06K 9/00288 382/103 |
| 2014/0196112 A1 * | 7/2014 | Huang | G06F 1/1632 726/3 |
| 2015/0172778 A1 | 6/2015 | Soon-Shiong et al. | |
| 2015/0220806 A1 * | 8/2015 | Heller | G06K 9/4676 382/159 |

OTHER PUBLICATIONS

IEEE P802.11ad, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", IEEE Computer Society, Dec. 28, 2012, 628 pp.
IEEE P802.11ac-2013, "IEEE Standard for Information technology—Telecommunications and Information Exchange Between Systems—LAN/MAN—Specific Requirements—Part 11: Wireless LAN Medium Access Control and Physical Layer Specifications—Amendment 4: Enhancements for Very High Throughput for Operation in Bands below 6 GHz", IEEE Computer Society, Dec. 11, 2013, 395 pp. [uploaded in parts].
"Hashtagify Popular Hastags: Global Top 30," hastagify.me, retrieved on Apr. 6, 2015 from http://hastagify.me/popular, 4 pp.
"Trending on Twitter," hastags.org, retrieved on Apr. 6, 2015 from https://hashtags.org/trending-on-twitter/, 1 pp.
"Top HashTags on Instragram," top-hashtags.com, retrieved on Apr. 6, 2015 from http://top-hastags.com/instragram, 6 pp.
Tsai, et al., "Fast geometric re-ranking for image-based retrieval," in Image Processing (ICIP), 2010 17th IEEE International Conference on , vol., No., Sep. 26-29, 2010, pp. 1029-1032.
Zambanini, et al., "Classifying Ancient Coins by Local Feature Matching and Pairwise Geometric Consistency Evaluation," Aug. 24-28, 2014 22nd International Conference on Pattern Recognition (ICPR), 6 pp.
"Mobile Visual Search," POM 2020: Programmable Open Mobile Internet, retrieved on Jan. 13, 2015 from http://pomi.standord.edu/content.php?page=research&subpage=visualsearch, 3 pp.
Quick, "Millimeter-wave TV camera sees through smoke, fog and even walls," gizmag.com, Jun. 15, 2010, retrieved from http://www.gizmag.com/nhk-millimeter-wave-tv-camera/15411/, 2 pp.
Girod, "Feature-based methods for image matching," Digital Image Processing, 2013, accessed on Jan. 13, 2015, 31 slides.
International Search Report and Written Opinion from corresponding PCT/US2016/044588—ISA/EPO—dated Dec. 21, 2016 (21 pages).
Invitation to Pay Additional Fees and, Where Applicable, Protest Fee from corresponding PCT Application Serial No. PCT/US2016/044588 dated Oct. 5, 2016 (7 pages).
Response to Written Opinion dated Apr. 7, 2017 from corresponding PCT Application Serial No. PCT/US2016/044588 (21 pages).
International Preliminary Report on Patenability from corresponding PCT Application Serial No. PCT/US2016/044588 dated Oct. 30, 2017 (25 pages).
Second Written Opinion from corresponding PCT Application Serial No. PCT/US2016/044588 dated Aug. 1, 2017 (9 pages).

* cited by examiner

| Object | Attributes | First Hand Derived Info | Second Hand Derived Info (from relationship) |
|---|---|---|---|
| Tree | Type | Southwest US; (un)healthy tree Young/old tree | Drought/no drought, rain, winter, spring, healthy, prosperous, solo, lonely; Green world; air; oxygen; no-CO2, nature.... |
| | Physical size (height, width, thickness) | | |
| | Multiple branches | | |
| | Branch coloring | | |
| Leaves | Type | Photosynthesis; tree type; edible/nonedible; salad | |
| | Color | | |
| | Physical size (long, small, compound) | | |

FIG. 10

SYSTEM AND METHOD FOR ACCESSING IMAGES WITH A CAPTURED QUERY IMAGE

TECHNICAL FIELD

This disclosure relates to techniques for accessing images via a captured query image.

BACKGROUND

Users store large sets of digital materials such as presentation slides, documents, and papers in the file systems of their computing devices. It is easy to access these materials if one can remember a query word that would allow them to search through the file system. However, some materials, such as the highly visual representations in presentation slides, include pages with images interspersed among other content; it can be difficult to locate a desired image or graphical figure in such materials.

This problem is exacerbated in wireless docking situations. In a wireless docking system, a wireless dockee (WD) (e.g., a mobile device such as a smart phone) may dock wirelessly with a wireless docking center (WDC), also known as a docking host or docking station. The WD and WDC may establish a docking session with each other. The WDC may enable interaction between the WD and any number of peripheral devices (PF) that are associated with the WDC. The peripheral devices may, for example, include displays, projectors, speakers, keyboards, mice, joysticks, data storage devices, network interface devices, other docking hosts, remote controls, cameras, microphones, printers, or other devices. Such peripheral devices may include stand-alone devices or components of devices such as other computers, in different examples. It can be difficult to query file systems on these peripheral devices, let alone attempt to find particular pages within collections of pages stored on these peripheral devices.

SUMMARY

In some examples, this disclosure describes techniques for a wireless docking system environment in which a wireless dockee device is enabled to configure peripheral functions, analyze images, and retrieve information relevant to the images from a wireless docking center.

In one example, a method comprises acquiring, by a wireless dockee (WD), an image; initiating a wireless connection between the wireless dockee (WD) and a wireless docking center (WDC) having one or more peripherals; determining attributes associated with the acquired image, wherein the attributes include feature descriptors; receiving, at the WD and from the WDC, information representative of matching items stored on one or more of the peripherals, wherein the matching items include images with attributes similar to the attributes associated with the acquired image; selecting, at the WD and as a function of the information representative of the matching items, one or more of the matching items; and receiving, from the one or more of the peripherals, the selected matching items.

In another example, a wireless dockee (WD) comprises a memory; one or more processors; a docking service module executable by the one or more processors to perform a plurality of operations to wirelessly dock with a wireless docking center (WDC) such that the WD may access one or more peripheral functions (PFs) associated with the WDC; one or more peripheral service modules executable by the one or more processors, wherein each peripheral service module corresponds to at least one PF of the one or more PFs associated with the WDC; and an application service platform (ASP) module, wherein the ASP module is executable by the one of more processors to acquire an image, to determine attributes associated with the acquired image, to receive, from the WDC, information representative of matching items stored on one or more of the PFs, wherein the matching items include images with attributes similar to the attributes associated with the acquired image, to select, as a function of the information representative of the items, one or more of the matching items, and to receive the selected matching items when retrieved from the corresponding PFs.

In another example, a non-transitory computer-readable storage medium stores instructions that, when executed, cause one or more processors of a wireless dockee (WD) to: acquire an image; initiate a wireless connection between the WD and a wireless docking center (WDC) having one or more peripheral functions (PFs); determine attributes associated with the acquired image; receive, from the WDC, information representative of matching items stored on one or more of the PFs, wherein the matching items include images with attributes similar to the attributes associated with the acquired image; select, as a function of the information representative of the matching items, one or more of the matching items; and receive the selected matching items.

In another example, a method comprising: connecting a wireless docking center (WDC) to one or more peripherals; docking a wireless dockee (WD) to the WDC via a wireless interface, wherein docking includes connecting one or more peripherals to peripheral services on the WD: receiving, from the WD, information representative of an acquired image; determining, at the WDC and based on the information, if there are items on the one or more peripherals with images similar to the acquired image; returning to the WD a list of one or more items with images similar to the acquired image; receiving, from the WD, an indication of items selected from the list; retrieving the selected items from one or more of the peripherals; and transmitting the retrieved selected items to the WD.

In another example, a non-transitory computer-readable storage medium stores instructions that, when executed, cause one or more processors of a wireless docking center (WDC) to: host a docking service; host an application service platform (ASP); host one or more peripheral services that each correspond to at least one peripheral of the one or more peripherals associated with the WDC; wirelessly docking with a wireless dockee (WD), wherein wirelessly docking includes connecting one or more of the peripherals to peripheral services on the WD: receive, from the WD, information representative of an acquired image: determine, based on the information, if there are items on the one or more peripherals with images similar to the acquired image; return to the WD a list of one or more items with images similar to the acquired image; receive, from the WD, an indication of items selected from the list; retrieve the selected items from one or more of the peripherals; and transmit the retrieved selected items to the WD.

In another example, a method comprises identifying objects within a plurality of images, wherein identifying includes assigning one or more descriptors to each object and saving each object and its descriptors in an image object dictionary; assigning attributes to the objects; analyzing an image to determine whether objects from the image object dictionary are present in the image; adding descriptors to the objects; and adding, to an attribute of an object, first hand derived information relevant to the object in the image.

The details of one or more examples are set forth in the accompanying drawings and the description below. Other features, objects, and advantages will be apparent from the description and drawings, and from the claims.

BRIEF DESCRIPTION OF DRAWINGS

FIG. 10 illustrates an example of the technique described in FIG. 9.

DETAILED DESCRIPTION

Figure 1:
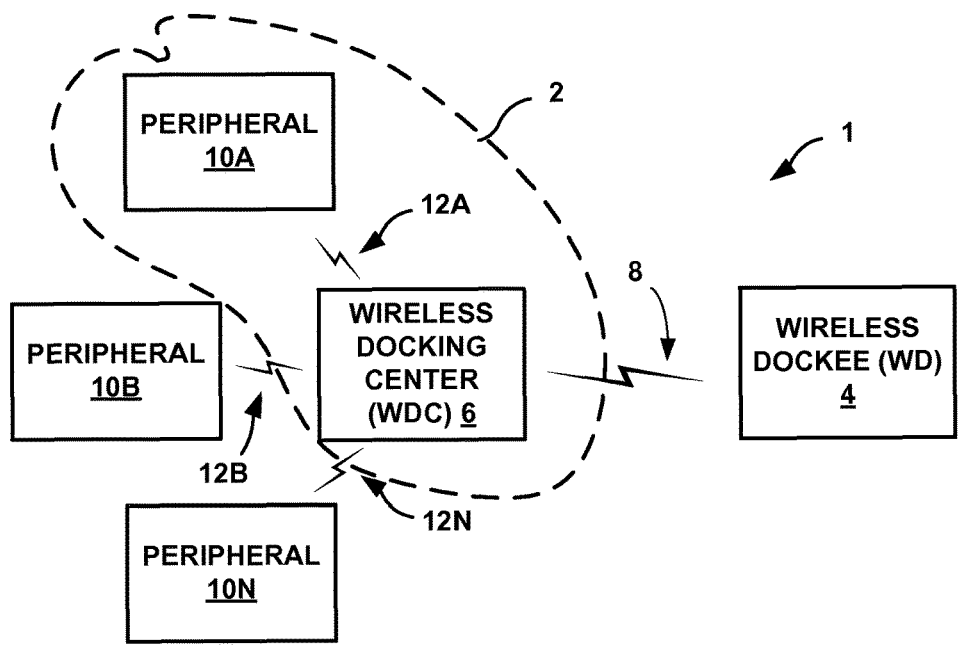
FIG. 1 is a conceptual diagram of an example wireless docking system in which a wireless dockee (WD) is configured to dock with a wireless docking center (WDC) over a wireless communication channel, in accordance with one or more techniques of this disclosure.

The following example definitions and terms may apply to this disclosure, (while additional definitions may be applicable in some examples):

Application Service Platform (ASP): a software service or library that implements the common functions needed by all applications and services conforming to the Wi-Fi Direct Services specification.

Docking: The process of a wireless dockee (WD) learning the peripheral devices that a wireless docking center (WDC) is advertising as available and connecting to the WDC and to all or a subset of the peripheral devices with at most one user pairing step.

Docking Environment Type: A recommended minimum set of peripherals and the attributes to support the peripherals and the peripheral functions (e.g., a Docking Environment Type for 'Home Office Docking').

Peripheral Function: A logical I/O function that is not part of a WD, but can be made available to the WD through docking with a WDC.

Peripheral Function Protocol: A protocol through which a peripheral can be used/accessed through a Wi-Fi network. Examples of peripheral function protocols are WSB, Wi-Fi Display, and WiGig Display Extension.

Wireless dockee (WD): A portable device (e.g., smart phone, netbook, laptop, or camera) that is capable of docking with a Wireless Docking Environment.

Wireless docking center (WDC): A logical entity that coordinates the setup of connections between a Wireless Dockee and the full set or subset of all the peripherals managed by the WDC.

Wireless Docking Environment (WDN): A group of peripherals to which a WD can wirelessly dock to obtain a peripheral function.

WFDS Wi-Fi Direct Services: a standard specification defined by the Wi-Fi alliance, which is built on Wi-Fi direct. The specification defines an architecture, protocols and functionality for interoperability of Wi-Fi Direct Services peers.

As noted above, users accumulate and store digital material such as images and documents in the file systems of their computing devices. Word searches can be used to locate some of these materials, but others are largely visual in nature and it can be difficult to those documents based on word searches. What is described below is a system and method for locating a document via an image search based on a query image supplied by the dockee to a wireless docking center. The approach may be used to search items having images, such as documents and PowerPoint or other such presentations, for items having similar images.

In one example approach, a device having a camera captures a query image, analyzes the image using image recognition software, and submits a query based on the analysis of the query image to a computer system to retrieve digital materials based on the analysis. The device receives back documents, presentations, papers, etc. that match the query image.

In one such approach, a mobile device such as a mobile telephone captures an image. The image is analyzed to obtain descriptors and the descriptors are used to access documents stored as files on peripheral devices attached to a wireless docking center in a wireless docking system. In one example approach, a wireless docking system recognizes images in documents on peripheral devices attached to a wireless docking center. An image captured by a wireless dockee (e.g., a smart phone or laptop) is analyzed to obtain descriptors and the descriptors are used to access documents having similar images stored on the peripheral devices.

In one such approach, a user captures the query image of a printed copy of the document or of a figure in the document. The document retrieval application analyzes the captured query image and uses the properties of the image to access the soft copy of the figure or of similar figures to the query image. In one example approach, the user selects the document she is interested in from the list of similar figures and documents and opens the selected document in the appropriate application. For instance, a PowerPoint presentation is opened in a presentation processing application, while a word processing document is opened in a word processing application.

In some examples, an acquired image is analyzed for attributes such as feature descriptors. The attributes are then used to locate similar images in files such as documents stored on a peripheral device communicatively connected to the wireless docking center. In some such examples, image retrieval relies on robust local feature analysis of the acquired image to develop feature descriptors representing aspects of the acquired image. Scale-Invariant Feature Transform (SIFT), for instance, extracts features from the acquired image that can be used despite moderate geometric and illumination distortions in the acquired image. An alternative to SIFT, termed Speeded-Up Robust Features (SURF), offers similar image retrieval performance. In yet another approach, the image recognition part of the system is realized via vocabulary based image recognition with geometric consistency. In some examples, the system and method may be used to obtain instant access to the requested document in a large set of documents.

In one example approach, an image analysis technique is used to recall one or more query images from a large set of images. In some example approaches, the captured query image includes perspective deformations of around 45 degrees of tilt from frontal capture location and up to 4x smaller resolution than the original database image. This adds robustness to the system, allowing the user to capture the query image from various viewpoints and still recall the corresponding slides.

Visual search systems work as follows: you start with a database of images, and the first step is to train a vocabulary (a dictionary) of visual words representative of the whole database. For each image in the database, you extract descriptors and compare the descriptors to the vocabulary. For each of the visual words in the vocabulary, you determine the database image in which it occurs and the number of times it occurs in each image. The result is an inverted index of the visual words representing the image database. This process may be done offline and the resulting vocabulary may be stored with the image database.

In some example approaches, the system may be trained and used in various environments such as a wireless docking station capable of accessing a variety of personal storage devices. An application trained to access documents in such peripheral storage devices may be used, for example, by a mobile phone connected to the docking station to retrieve particular documents as a function of an image acquired by the mobile phone. In one such approach, the vocabulary and the image database are stored on peripherals attached, by wire or wirelessly, to the wireless docking station and are accessed via a document retrieval application executing on a processor of the mobile phone.

In one example approach, the wireless docking station calculates the vocabulary and the inverted index for all the documents stored in an image database in the personal storage devices. In another example approach, the vocabulary for a particular image database is determined offline and the vocabulary determined is stored with that particular image database in the wireless docking station.

In one example approach, when a user has a query image on, for instance, a device such as a phone, a document retrieval application executing on a processor on the device extracts descriptors from the query image and determines whether each descriptor resembles a word in the vocabulary. If a first descriptor extracted from the query image is similar to, for example, word number 5 in the vocabulary the document retrieval application gives a vote for all of the database images containing word number 5 (where it gets this information from the inverted index). The document retrieval application process performs this process for each descriptor extracted from the query image and determines the images in the image database that best fit the set of descriptors extracted from the query image. In one example approach, the document retrieval application accumulates the number of votes received for the image in the image database and selects an image accordingly; the database images with the highest votes are more likely to match the query image.

In some example approaches, the document retrieval application is distributed across the mobile device and the wireless docking station. Depending on the resources in each of the mobile device and the wireless docking station, one may distribute the document retrieval application so that:

a. a phone (or other mobile device) captures an image and sends the captured image to the docking station. The docking station extracts descriptors from the captured image, compares the descriptors to the vocabulary and returns the matching image from database.

b. a phone (or other mobile device) captures an image, extracts descriptors from the captured image and sends the descriptors to the docking station. The docking station compares the descriptors to the vocabulary and returns the matching image from database.

c. the docking station sends the vocabulary and the inverted index to the phone when a docking session starts and the phone captures an image, extracts descriptors from the captured image, compares the descriptors to the vocabulary and retrieves the matching image or images from the image database on the docking station.

In one example approach, a wireless dockee acquires an image (via a camera or by reading from memory). Either the wireless dockee or the wireless docking center analyzes the acquired image to extract descriptors of the acquired image. The descriptors are then used to select, in the wireless docking system, files that contain images that most closely match the acquired image. Then geometric consistency is used to choose the best image from the matching images.

In one example approach, a user starts the application, which loads an already learned vocabulary to the memory of a mobile computing device. The user captures, in the mobile computing device, the query image of a printed copy of the document or of a figure and submits the query image to a second computing device (such as a wireless docking center). The second computing device runs an application to extract descriptors representative of the captured query image and uses the descriptors to query its database of documents and images. The second computing device returns, to the first computing device, access to the soft copy of the figure or to figures relevant to the query image. In some example approaches, the second computing device returns instant access to the soft copy of documents that include the figure and, in some cases, to documents with figures similar to the query image. The user can then select the document or documents they are interested in from the list of documents with similar figures and initiate a corresponding presentation (e.g., PowerPoint) or document processing application.

The application, therefore, may allow users to instantly access a soft copy of a printed document by simply capturing the image of the query. The system is robust to large perspective deformations, increasing the likelihood that the query image is recognized even when the figure is captured without significantly constraining the camera capture position.

In some example approaches, the display of particularly rare features is augmented on the display via a highlight or other indicator, or through additional description.

As detailed below, in some example approaches, wireless docking may be comprised of four components: discovery, connection setup, session setup, and configuration and control protocol. Discovery may enable a wireless dockee to identify a wireless docking center and its service attributes. After initial discovery, the wireless dockee may connect to the wireless docking center by setting up a new ASP session for the docking service. After the session setup, the configuration and control protocol may enable the wireless dockee (e.g., a mobile device such as a smart phone) to negotiate and configure its own use of a peripheral at the wireless docking center. Subsequently, the wireless docking center may enable the access to the peripheral services for the wireless dockee by establishing payload connections for individual peripheral services with the wireless dockee.

FIG. 1 is a conceptual diagram of an example wireless docking system 1 in which a wireless dockee (WD) 4 is configured to wirelessly dock with a wireless docking center (WDC) 6 over a communication channel 12 (12A, 12B . . . 12N) in order to utilize one or more peripherals 10 associated with wireless docking center 6, in accordance with one or more techniques of this disclosure. As illustrated in FIG. 1, wireless docking system 1 includes wireless dockee 4, wireless docking center 6, wireless communication channel 8, peripherals (PF) 10A-10N (collectively "peripherals (PFs) 10"), and communication channels 12A-12N (collectively "communication channels 12"). In some example approaches, communication channels 12 include wireless and wired communication channels.

In some examples, a wireless dockee 4 may wirelessly dock with a wireless docking center 6 by selecting one or more of the peripherals 10 associated with the wireless docking center 6. For instance, wireless dockee 4 may individually select a display peripheral 10 and a keyboard peripheral 10. In some examples, as opposed to selecting individual peripherals, a wireless dockee may select one or more wireless docking environments (WDNs) 2 that each correspond to one or more of the peripherals 10 associated with the wireless docking center 6.

A docking environment is the minimum set of peripherals and attributes needed to support a particular peripheral function for a computing device (e.g., dockee). In some example approaches, each wireless docking system 1 includes a wireless docking center 6 and one or more peripherals. One or more of the peripherals 10 can be configured as peripheral functions (PFs) if desired.

A wireless docking environment is a docking environment in which the dockee docks via a wireless communication channel. In some examples, wireless docking environments 2 are either WD-Centric or WDC-Centric. A WD-Centric WDN is a wireless docking environment that is defined (e.g., created) by a wireless dockee for use by the wireless dockee. Configuration data for WD-Centric WDNs may be stored at a wireless docking center 6, at a wireless dockee 4, or both.

A WDC-Centric wireless docking environment is a wireless docking environment that is available for general use (e.g., by a plurality of wireless dockees 4). In some examples, wireless docking environment 2 may be a particular type of wireless docking environment 2. Some example wireless docking environment types include, but are not limited to, an office wireless docking environment type, an entertainment wireless docking environment type, a public workplace wireless docking environment type, an audio only wireless docking environment type, and an enterprise office wireless docking environment type. In some examples, an office wireless docking environment type may be associated with a display peripheral, a mouse peripheral, and a keyboard peripheral. In some examples, an audio only wireless docking environment type may be associated with an audio sink peripheral (e.g., speakers).

Wireless docking system 1 may include wireless dockee 4 which may be configured to wirelessly dock with a wireless docking center 6 over a wireless communication channel 8 in order to access one or more peripherals 10 associated with the wireless docking center 6. For instance, wireless dockee 4 may wirelessly dock with wireless docking center 6 over wireless communication channel 8 in order to access one or more of peripherals 10. Examples of wireless dockee 4 may include, but are not limited to mobile devices such as smart phones or other mobile handsets, tablet computers, laptop computers, one or more processing units or other integrated circuits or chip sets, or other electronic device.

Wireless communication channel 8 may be any channel capable of propagating communicative signals between wireless dockee 4 and wireless docking center 6. In some examples, wireless communication channel 8 may be implemented in radio frequency communications in frequency bands such as the 2.4 gigahertz (GHz) band, the 5 GHz band, the 60 GHz band, or other frequency bands. In some examples, wireless communication channel 8 may comply with one or more sets of standards, protocols, or technologies among Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), or other standards, protocols, or technologies. The frequency bands used, such as the 2.4 GHz, 5 GHz, and 60 GHz bands, may be defined for purposes of this disclosure as they are understood in light of the standards of Wi-Fi, WiGig, any one or more IEEE 802.11 protocols, or other applicable standards or protocols.

Wireless docking system 1 may include wireless docking center 6 which may be configured to operate as a wireless docking host device for a wireless dockee in order to facilitate the wireless dockee's utilization of one or more peripherals associated with wireless docking center 6. In other words, wireless docking center 6 may be a wireless docking host device that serves as a connectivity agent within a computing and/or communication environment. For instance, wireless docking center 6 may wirelessly dock with wireless dockee 4 over wireless communication channel 8 in order to facilitate wireless dockee 4's utilization of one or more of peripherals 10. Wireless docking center 6 may be a dedicated wireless dock, or may also be implemented in a smart phone or other mobile handset, a tablet computer, a laptop computer, a computer monitor, or other electronic device, or as a component or subsystem of any of the above.

In some examples, wireless docking center 6 may be associated with one or more of peripherals 10. As one example, a peripheral of peripherals 10 may be associated with wireless docking center 6 where the peripheral is managed by wireless docking center 6. A peripheral may be considered to be managed by wireless docking center 6 when wireless docking center 6 is able to facilitate a wireless dockee's utilization of the peripheral. As another example, a peripheral of peripherals 10 may be associated with wireless docking center 6 where the peripheral is communicatively coupled to wireless docking center 6, such as by a respective communication channel of communication channels 12.

Wireless docking system 1 may include one or more peripherals 10 which may be associated with a wireless docking center 6 and may each be configured to provide one or more services to a wireless dockee that is wirelessly docked with the associated wireless docking center 6. For instance, where a peripheral of peripherals 10 is associated with wireless docking center 6 and wireless dockee 4 is wirelessly docked with wireless docking center 6, the peripheral may provide one or more services to wireless dockee 4. Examples of peripherals 10 may include, but are not limited to, displays, projectors, speakers, keyboards, mice, joysticks, data storage devices, network interface devices, other docking hosts, remote controls, cameras, microphones, printers, or any of various other devices capable of providing a service.

In some examples, one or more of peripherals 10 may be communicatively coupled to wireless docking center 6, such as by a respective communication channel of communication channels 12. For instance, peripheral 10A may be communicatively coupled to wireless docking center 6 via communication channel 12A. In some examples, one or more of communication channels 12 may be wired communication channels. For instance, one or more of communication channels 12 may include a universal serial bus (USB) cable, a network cable, a fiber optic cable, and/or any other cable capable of communicating information. In some examples, one or more of communication channels 12 may be wireless communication channels. For instance, one or more of communication channels 12 may include a Bluetooth link, a Wi-Fi link (which may be similar to wireless communication channel 8), an optical link, and the like. In some examples, one or more of peripherals 10 may be included in wireless docking center 6. For instance, wireless docking center 6 may include a display of peripherals 10.

A user of wireless dockee 4 may desire to access one or more of peripherals 10 associated with wireless docking center 6 without physically connecting wireless dockee 4 to wireless docking center 6. For instance, where wireless dockee 4 is a mobile computing device with a relatively small touch-sensitive display for receiving user input (e.g., a virtual keyboard) and peripherals 10 include a full size monitor (e.g., 20" diagonal) and a full size physical keyboard, the user of wireless dockee 4 may desire to utilize the full size monitor and the full size keyboard to interact with wireless dockee 4. However, it may not be desirable to require the user to establish a wired connection between wireless dockee 4 and the full size monitor and keyboard. In accordance with one or more techniques of this disclosure, wireless dockee 4 may wirelessly dock with wireless docking center 6 via wireless communication link 8 in order to access one or more of peripherals 10. In this way, techniques of the disclosure may enable the user to access one or more of peripherals 10 associated with wireless docking center 6 (i.e., the full size monitor and keyboard) without physically connecting wireless dockee 4 to wireless docking center 6.

In one example approach, a wireless dockee 4 such as a smart phone is connected via wireless channel 8 to a wireless docking center 6. Smartphone 4 includes a camera 14 used to acquire images that smart phone 4 may transmit to wireless docking center 6. In some such example approaches, wireless dockee 4 extracts descriptive features from the acquired images before sending the extracted features with or without the image to wireless docking center 6. In other such examples, wireless docking center 6 or one of the peripherals 10 extracts descriptive features from the image instead of or in addition to the features extracted by wireless dockee 4.

In one example approach, wireless docking center 6 searches a database via the extracted features to detect documents with images that are similar to the acquired image and sends indicia representing one or more of the detected documents to wireless dockee 4. In one example approach, one or more of the detected documents are displayed as thumbnails on smart phone 4 and can be selected by a smart phone user for retrieval and display of the document itself.

In another example approach, wireless docking center 6 transmits a searchable database to wireless dockee 4 and wireless dockee 4 searches the database using the extracted features to detect documents with images that are similar to the acquired image. In one such example approach, wireless dockee 4 then displays the detected documents as thumbnails on smart phone 4, for selection and document retrieval by a smart phone user.

Figure 2:
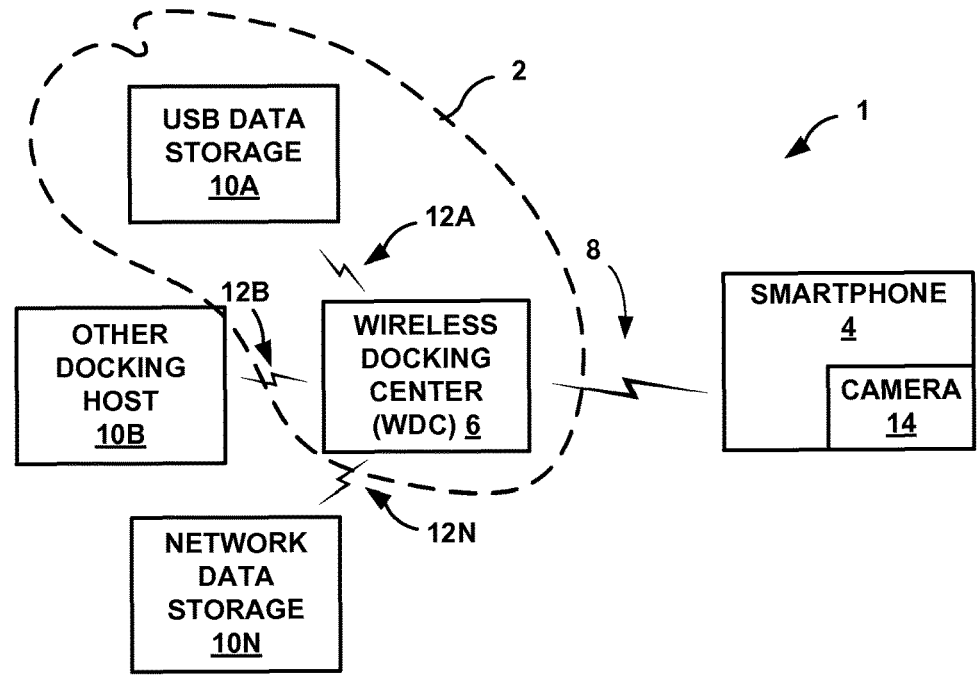
FIG. 2 is a conceptual diagram of an example wireless docking system in which the wireless dockee (WD) is a smart phone configured to dock with a wireless docking center (WDC) over a wireless communication channel, in accordance with one or more techniques of this disclosure.

As can be seen in FIG. 2, the documents to be retrieved may be stored in a USB device 10A such as a flash drive plugged, in some cases, directly into the USB slot of wireless docking center 6. In some example approaches, the documents to be retrieved may be stored in storage devices connected to another docking host 10B (such as another wireless docking center). And, in some example approaches, the documents to be retrieved may be stored in a network storage device 10C. In some example approaches, wireless dockee 4 is a smartphone with a camera 14 that may be used to capture a query image.

Figure 3:
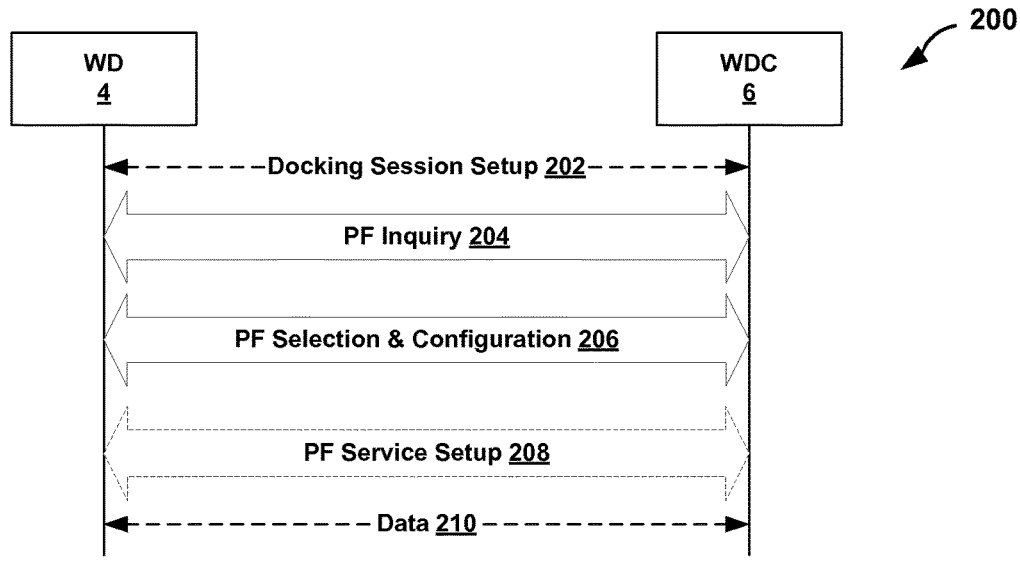
FIG. 3 is a communication flow diagram illustrating an example data flow between a WD and a WDC performing techniques to wirelessly dock such that the WD may access one or more peripherals associated with the WDC, in accordance with one or more examples of this disclosure.

FIG. 3 is a communication flow diagram illustrating example data flow 200 between a wireless dockee (WD) and a wireless docking center (WDC) performing techniques to wirelessly dock such that the wireless dockee may access one or more peripherals associated with the wireless docking center, in accordance with one or more examples of this disclosure. The techniques of FIG. 3 may be performed by a wireless dockee, a wireless docking center and one or more peripherals, such as wireless dockee 4, wireless docking center 6 and peripherals 10 illustrated in FIGS. 1 and 2. For purposes of illustration, the techniques of FIG. 3 are described within the context of wireless dockee 4 and wireless docking center 6 of FIGS. 1 and 2, although computing devices having configurations different than that of wireless dockee 4 and wireless docking center 6 may perform the techniques of FIG. 3.

A docking configuration and control protocol may be used by wireless dockee 4 to select and configure the peripherals 10 of its interests in the Docking session. In some example approaches, the combination of the wireless docking center 6 and the selected peripherals 10 define one or more wireless docking environments.

In some example approaches, before the docking configuration and control protocol operates on individual peripherals, wireless dockee 4 may perform a user type authentication procedure, if this is required by wireless docking center 6. Wireless docking center 6 may indicate such a requirement using, for example, the element "isUserTypeAuthRequired" during a pre-association discovery phase.

An example sequence of the docking configuration and control procedures for peripherals is shown in FIG. 3. In the example, wireless dockee 4 sets up a docking session and obtains peripheral information using a PF Inquiry procedure. Then, if needed, wireless dockee 4 selects and configures the peripherals 10 of its interests. Upon the completion of the peripheral selection and configuration, wireless dockee 4 and wireless docking center 6 setup individual PF Services.

In one such example approach, in accordance with one or more techniques of this disclosure, wireless dockee 4 and wireless docking center 6 may exchange communications to perform a docking session setup procedure (202). For instance, wireless dockee 4 and wireless docking center 6 may exchange communications to establish a docking session via a direct wireless connection between wireless dockee 4 and wireless docking center 6.

Wireless dockee 4 and wireless docking center 6 may exchange communications to perform a PF inquiry procedure (204). For instance, wireless dockee 4 and wireless docking center 6 may exchange communications such that wireless dockee 4 may determine one or more peripherals associated with wireless docking center 6.

Wireless dockee 4 and wireless docking center 6 may exchange communications to a perform PF selection and configuration procedure (206). For instance, wireless dockee 4 and wireless docking center 6 may exchange communications such that wireless dockee 4 may select one or more peripherals associated with wireless docking center 6.

Wireless dockee 4 and wireless docking center 6 may exchange communications to perform a PF service setup procedure (208). For instance, wireless dockee 4 and wireless docking center 6 may exchange communications to setup one or more services associated with the one or more selected peripherals on one or both of wireless dockee 4 and wireless docking center 6.

Wireless dockee 4 and wireless docking center 6 may exchange data, such as peripheral data (210). For instance, wireless dockee 4 and wireless docking center 6 may exchange communications such that wireless dockee 4 may access the one or more selected peripherals. In this way, wireless dockee 4 may wirelessly dock with wireless docking center 6 such that wireless dockee 4 may access the one or more selected peripherals associated with wireless docking center 6. Further details of docking and of communication between wireless dockee 4 and wireless docking center 6 and between wireless dockee 4 and peripherals 10 are described in U.S. patent application Ser. No. 14/265,833, entitled "Wireless Docking Architecture," filed Apr. 30, 2014, the description of which is incorporated herein by reference.

Figure 4:
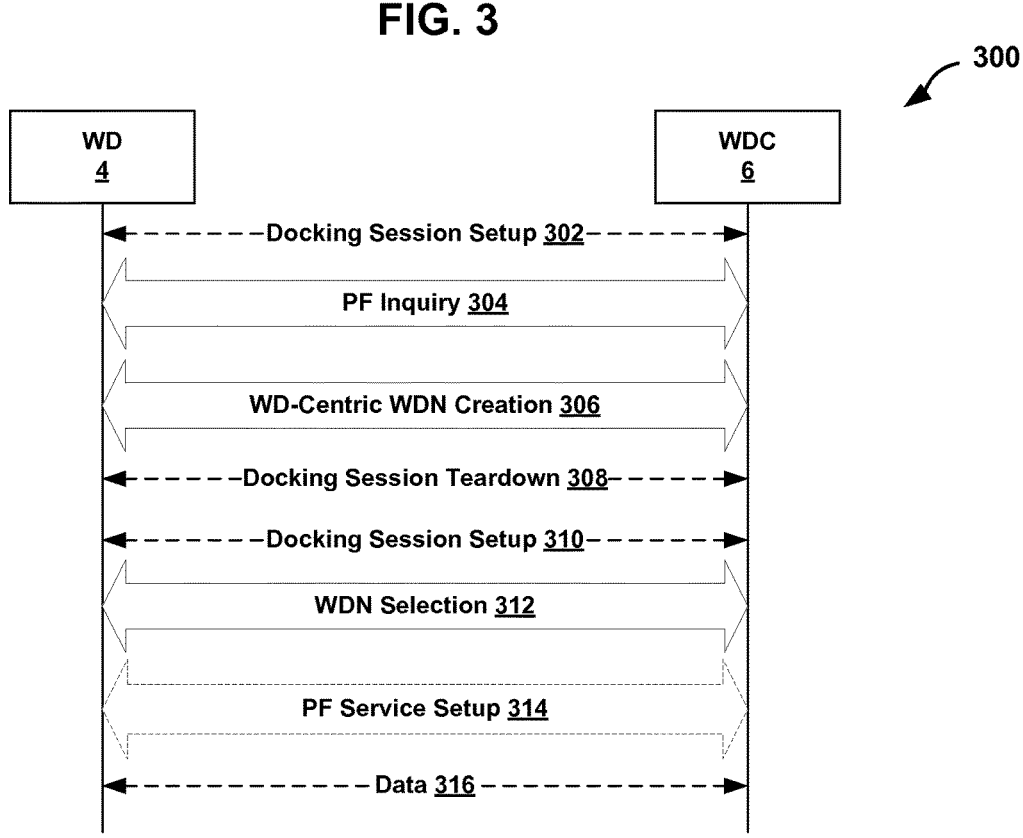
FIG. 4 is a communication flow diagram illustrating an example data flow between a WD and a WDC performing techniques to wirelessly dock such that the WD may create and access one or more wireless docking environments (WDNs) associated with the WDC, in accordance with one or more examples of this disclosure.

FIG. 4 is a communication flow diagram illustrating example data flow 300 between a wireless dockee and a wireless docking center performing techniques to wirelessly dock such that the wireless dockee may create and access one or more wireless docking environments 2 associated with wireless docking center 6, in accordance with one or more examples of this disclosure. The techniques of FIG. 4 may be performed by a wireless dockee and a wireless docking center, such as wireless dockee 4 and wireless docking center 6 illustrated in FIGS. 1 and 2. For purposes of illustration, the techniques of FIG. 4 are described within the context of wireless dockee 4 and wireless docking center 6 of FIGS. 1 and 2, although computing devices having configurations different than that of wireless dockee 4 and wireless docking center 6 may perform the techniques of FIG. 4.

A docking configuration and control protocol may be used by wireless dockee 4 to select and configure the wireless docking environments of its interest in a Docking session. Before the docking configuration and control protocol operates on wireless docking environments, wireless dockee 4 may perform a user type authentication procedure, if this is required by wireless docking center 6. Wireless docking center 6 may indicate such a requirement using the element "isUserTypeAuthRequired" during a pre-association discovery phase.

An example sequence of the docking configuration and control protocol operations for wireless docking environments 2 is shown in FIG. 4. In the example, wireless dockee 4 first obtains the peripheral information using the PF Inquiry procedure. Then, wireless dockee 4 creates a wireless docking environment 2 for its future use. In a future Docking session, wireless dockee 4 can directly select its WD-Centric wireless docking environment 2, which includes the selection and configuration of peripherals 10 of its interests. Upon the completion of the wireless docking environment selection, wireless dockee 4 and wireless docking center 6 setup individual PF Services.

In accordance with one or more techniques of this disclosure, wireless dockee 4 and wireless docking center 6 may exchange communications to perform a docking session setup procedure (302). For instance, wireless dockee 4 and wireless docking center 6 may exchange communications to establish a docking session via a direct wireless connection between wireless dockee 4 and wireless docking center 6.

Wireless dockee 4 and wireless docking center 6 may exchange communications to a perform PF inquiry procedure (304). For instance, wireless dockee 4 and wireless docking center 6 may exchange communications such that wireless dockee 4 may determine one or more peripherals associated with wireless docking center 6.

Wireless dockee 4 and wireless docking center 6 may exchange communications to perform a WD-Centric wireless docking environment (WDN) creation procedure (306). For instance, wireless dockee 4 and wireless docking center 6 may exchange communications such that WD 4 may create a new wireless docking environment that corresponds to one or more peripherals associated with wireless docking center 6.

Wireless dockee 4 and wireless docking center 6 may exchange communications to perform a docking session teardown procedure (308). For instance, wireless dockee 4 and wireless docking center 6 may exchange communications to close one or more sessions open between wireless dockee 4 and wireless docking center 6.

At a later time, wireless dockee 4 may use the wireless docking environment 2 created during the wireless docking environment creation procedure. Wireless dockee 4 and wireless docking center 6 may exchange communications to perform a docking session setup procedure (310). For instance, wireless dockee 4 and wireless docking center 6 may exchange communications to establish a docking session via a direct wireless connection between wireless dockee 4 and wireless docking center 6.

At a later time, wireless dockee 4 and wireless docking center 6 may exchange communications to perform a wireless docking environment selection procedure (312). For instance, wireless dockee 4 and wireless docking center 6 may exchange communications such that wireless dockee 4 may select one or more of the wireless docking environments configured for use on wireless docking center 6.

Wireless dockee 4 and wireless docking center 6 may exchange communications to perform a PF service setup procedure (314). For instance, wireless dockee 4 and wireless docking center 6 may exchange communications to setup one or more services associated with one or more peripherals that correspond to the selected wireless docking environment on one or both of wireless dockee 4 and wireless docking center 6.

Wireless dockee 4 and wireless docking center 6 may exchange data, such as peripheral data (316). For instance, wireless dockee 4 and wireless docking center 6 may exchange communications such that wireless dockee 4 may access the one or more peripherals that correspond to the selected wireless docking environment 2. In this way, wireless dockee 4 may wirelessly dock with wireless docking center 6 such that wireless dockee 4 may access a wireless docking environment configured for use on wireless docking center 6.

Figure 5:
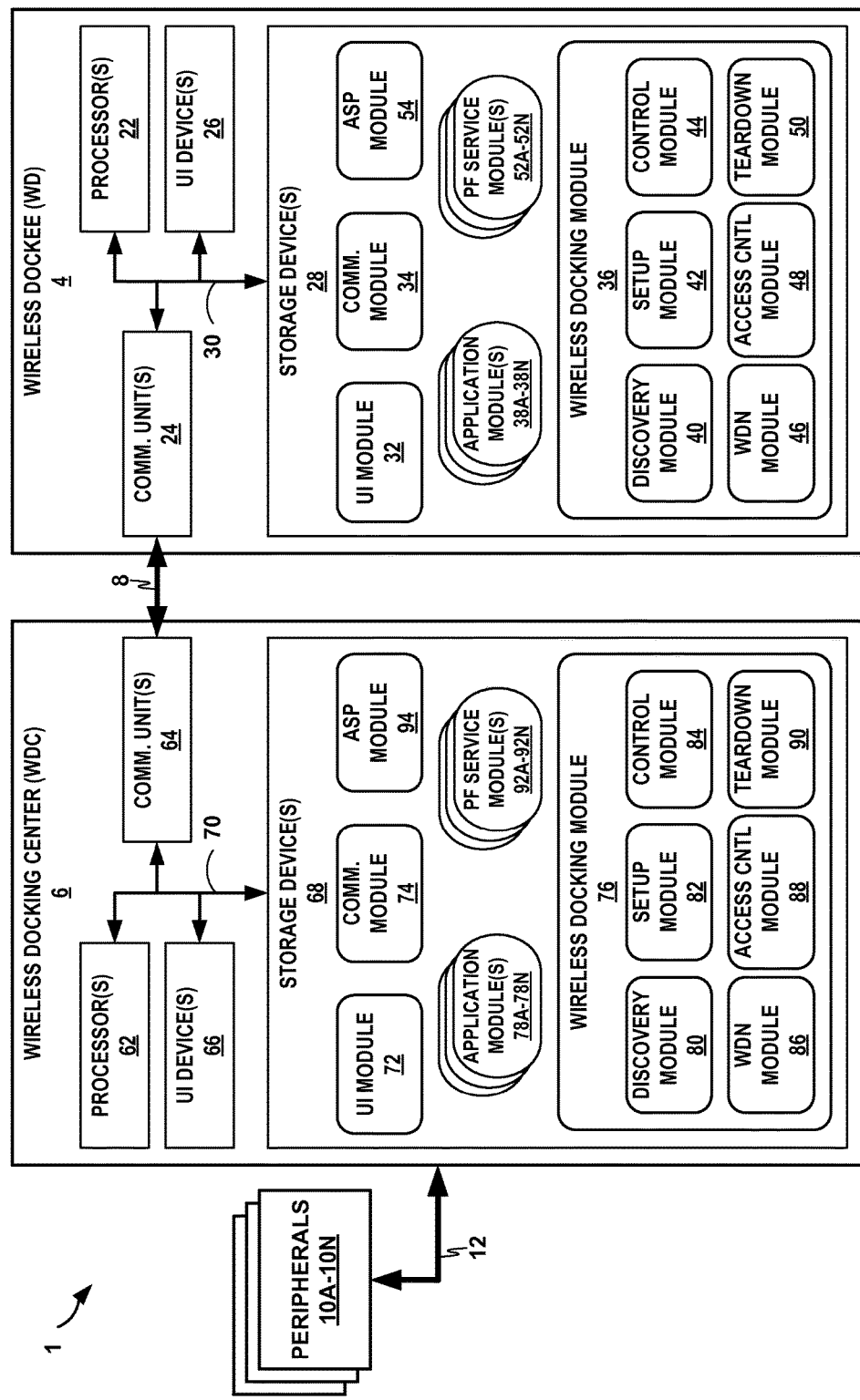
FIG. 5 is a block diagram illustrating further details of one example of the wireless docking system of FIG. 1 in which a WD is configured to wirelessly dock with a WDC over a wireless communication channel in order to access one or more peripherals associated with the WDC, in accordance with one or more techniques of the present disclosure.

FIG. 5 is a block diagram illustrating further details of one example of wireless docking system 1 in which example wireless dockee 4 is configured to wirelessly dock with example wireless docking center 6 over wireless communication channel 8 in order to utilize one or more of peripherals 10, in accordance with one or more techniques of the present disclosure. As illustrated in FIG. 5, wireless dockee 4 may include one or more processors 22, one or more communication units 24, one or more user interface (UI) devices 26, and one or more storage devices 28. Each of components 22, 24, 26, and 28 may be interconnected (physically, communicatively, and/or operatively) via communication channels 30 for inter-component communications. Communication channels 30 may include, for example, a system bus, network connection, interprocess communication data structure, or any other channel for communicating data. One or more of storage devices 28, in some examples, may include UI module 32, communication module 34, wireless docking module (WDM) 36, one or more application modules 38A-38N (collectively, "application modules 38"), one or more peripheral service modules 52A-52N (collectively, "service modules 52"), and application service platform (ASP) module 54.

Processors 22, in one example, are configured to implement functionality and/or process instructions for execution within wireless dockee 4 to perform techniques as described in this disclosure. For example, processors 22 may be capable of processing instructions stored in one or more of storage devices 28. Examples of processors 22 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Wireless dockee 4, in one example, utilizes one or more of the communication units 24 to communicate with external devices via one or more networks, such as one or more wireless networks like wireless communication channel 8. One or more of the communication units 24 may include a network interface card, such as an Ethernet card, an optical transceiver, a radio frequency transceiver, or any other type of device that can send and receive information. Other examples of such network interfaces may include Bluetooth, 3G, and Wi-Fi radios. In some examples, wireless dockee 4 utilizes communication unit 24 to wirelessly communicate with an external device. For instance, wireless dockee 4 may utilize communication unit 24 to wirelessly communicate with a communication unit 64 of wireless docking center 6 over wireless communication channel 8. In some examples, communication unit 24 may receive input from other components of wireless dockee 4, such as communication module 34 that cause communication unit 24 to wirelessly communicate with an external device.

In some examples, communication module 34 may manage communications between wireless dockee 4 and an external device, such as wireless docking center 6. For instance, in some examples, communication module 34 may connect to a network hosted by wireless docking center 6. In some examples, communication module 34 may exchange data with wireless docking center 6. As one example, communication module 34 may receive data such as peripheral data from wireless docking center 6. In some examples, communication module 34 may provide the received information to other components of wireless dockee 4. For example, communication module 34 may provide the received peripheral data to one or more of peripheral service modules 52.

As noted above, wireless dockee 4, in some examples, may also include one or more UI devices 26. In some examples, one or more of UI devices 26 can be configured to output content, such as media data. For instance, one or more of UI devices 26 may be configured to display video data at a display and/or output audio data from speakers. In addition to outputting content, one or more of UI devices 26 may be configured to receive tactile, audio, or visual input. Some examples of UI devices 26 include video displays, speakers, keyboards, touch screens, mice, cameras, and the like. In one example, UI devices 26 include a camera used to capture an image used to retrieve documents as detailed below.

As noted above, wireless dockee 4, in some examples, may also include a UI module 32. In some example approaches, UI module 32 performs one or more functions to receive content, such as UI data from other components associated with wireless dockee 4, and cause one or more of UI devices 26 to output the content. In some examples, UI module 32 may be configured to receive an indication of input, such as user input, and send the indications of the input to other components associated with wireless dockee 4, such as WDM 36. Using the data, UI module 32 may cause other components associated with wireless dockee 4, such as one or more of UI devices 26, to provide output based on the data.

One or more storage devices 28 may be configured to store information within wireless dockee 4 during operation. One or more of storage devices 28, in some examples, may comprise a computer-readable storage medium. In some examples, one or more of storage devices 28 may comprise a temporary memory, meaning that a primary purpose of one or more of storage devices 28 is not long-term storage. One or more of storage devices 28, in some examples, may comprise a volatile memory, meaning that one or more of storage devices 28 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 28 is used to store program instructions for execution by processors 22. One or more of storage devices 28, in one example, may be used by software or modules running on wireless dockee 4 (e.g., UI module 32, communication modules 34, WDM 36, peripheral service modules 52, and ASP module 54) to temporarily store information during program execution.

One or more of storage devices 28, in some examples, may also include one or more computer-readable storage media. One or more of storage devices 28 may further be configured for long-term storage of information. In some examples, one or more of storage devices 28 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Each of application modules 38 may represent an application provided by an entity that manufactures wireless dockee 4 or software operating on wireless dockee 4 or an application developed by a third-party for use with wireless docking center 6. Examples of application modules 38 may include applications for travel routing, maps, audio and/or video presentation, streaming video delivery and presentation, word processing, spreadsheets, voice and/or calls, weather, etc.

Wireless dockee 4, in some examples, may also include Application Service Platform (ASP) module 54 which may be configured to coordinate the discovery of services and manage the connections and sessions between wireless dockee 4 and wireless docking center 6. In some examples, ASP module 54 may receive process calls from one or more other components of wireless dockee 4, such as WDM 36. In some examples, ASP module 54 may provide event notifications to one or more other components of wireless dockee 4, such as WDM 36.

Wireless dockee 4, in some examples, may also include peripheral service modules 52 which may be configured to provide a peripheral service to one or more other components of wireless dockee 4, such as one or more of application modules 38. Some example peripheral services which may be provided by one or more of peripheral service modules 52 include, but are not limited to, a display service, a Wi-Fi serial bus (WSB) service, a printing service, and an audio service. In some examples, one or more of peripheral service modules 52 may be configured to exchange peripheral service session communications, which may include peripheral function data, with a corresponding peripheral service module of peripheral service modules 92.

Wireless dockee 4, in some examples, may also include WDM 36 which may perform one or more functions to wirelessly dock wireless dockee 4 with wireless docking center 6, such that wireless dockee 4 may access one or more peripheral functions (PFs) associated with wireless docking center 6 (e.g., with one or more of peripherals 10 across communication channel 12). In some examples, WDM 36 may include discovery module 40, setup module 42, control module 44, wireless docking environment module 46, access control module 48, and teardown module 50.

In some example approaches, WDM 36 may include discovery module 40 which may be configured to perform docking pre-association discovery with wireless docking center 6 to obtain information related to the wireless docking center. For instance, discovery module 40 may determine one or more peripherals 10 associated with a wireless docking center 6. As one example, discovery module 40 may receive the information from wireless docking center 6 via a wireless link 8. In some examples, the information may indicate one or more characteristics of wireless docking center 6. Some example characteristics which may be indicated by the information include, but are not limited to, a device type that indicates whether the sending device is a wireless dockee type device or a wireless docking center type device, a device name that indicates a friendly name of the sending device, a device availability status that indicates whether or not the sending device is available, an indication of one or more peripherals associated with the wireless docking center, and one or more docking environment types (e.g., one or more wireless docking environments) stored at wireless docking center 6.

WDM 36 may include setup module 42 which may be configured to setup a wireless docking connection between wireless dockee 4 and wireless docking center 6. As one example, setup module 42 may be configured to establish a docking session between wireless docking center 6 and wireless dockee 4 via a direct wireless connection 8 between wireless docking center 6 and wireless dockee 4. In some examples, setup module 42 may be configured to perform docking connection setup exchange between wireless docking center 6 and wireless dockee 4. In some examples, setup module 42 may be configured to perform docking ASP (application service platform) session setup between wireless docking center 6 and wireless dockee 4.

WDM 36 may include control module 44 which may be configured to manage one or more peripherals associated with wireless docking center 6. As one example, control module 44 may exchange docking configuration and control protocol communications with wireless docking center 6. For instance, control module 44 may be configured to select one or more of the peripherals 10 associated with wireless docking center 6.

WDM 36 may include wireless docking environment module 46 which may be configured to manage the selection/creation/modification/deletion of one or more wireless docking environments (WDNs) that each correspond to one or more peripherals. For instance, wireless docking environment module 46 may select a wireless docking environment 2 by sending a request to select a particular wireless docking environment 2 to wireless docking center 6.

WDM 36 may include access control module 48 which may be configured to perform one or more operations to obtain access rights to one or more of peripherals 10. For instance, access control module 48 may be configured to perform a user type authentication procedure with wireless docking center 6 by sending user credentials to wireless docking center 6. In some examples, the user credentials may include a user type and a passphrase.

WDM 36 may include teardown module 50 which may be configured to tear down a wireless docking connection between wireless dockee 4 and wireless docking center 6. As one example, teardown module 50 may perform docking ASP (application service platform) session teardown between wireless dockee 4 and wireless docking center 6. In some examples, teardown module 50 may be configured to perform the teardown procedure in response to not receiving a keep-alive signal from wireless docking center 6 in a period of time (e.g., 10 seconds, 30 seconds, or 5 minutes).

As illustrated in FIG. 5, wireless docking center 6 may include one or more processors 62, one or more communication units 64, one or more user interface (UI) devices 66, and one or more storage devices 68. Each of components 62, 64, 66, and 68 may be interconnected (physically, communicatively, and/or operatively) via communication channels 70 for inter-component communications. In some examples, communication channels 70 may include a system bus, network connection, interprocess communication data structure, or any other channel for communicating data. One or more of storage devices 68, in some examples, may include UI module 72, communication module 74, wireless docking module (WDM) 76, one or more application modules 78A-78N (collectively, "application modules 78"), one or more peripheral service modules 80A-80N (collectively, "service modules 80"), and application service platform (ASP) module 94.

Processors 62, in one example, are configured to implement functionality and/or process instructions for execution within wireless docking center 6 to perform techniques as described in this disclosure. For example, processors 62 may be capable of processing instructions stored in one or more of storage devices 68. Examples of processors 62 may include any one or more microprocessors, digital signal processors (DSPs), application specific integrated circuits (ASICs), field programmable gate arrays (FPGAs), or any other equivalent integrated or discreet logic circuitry, as well as any combinations of such components.

Wireless docking center 6, in some examples, also includes ones or more communication units 64. Wireless docking center 6, in one example, utilizes one or more of communication units 64 to communicate with external devices via one or more networks, such as one or more wireless networks. One or more of communication units 64 may be a network interface card, such as an Ethernet card, an optical transceiver, a radio frequency transceiver, or any other type of device that can send and receive information. Other examples of such network interfaces may include Bluetooth, 3G, and Wi-Fi radios. In some examples, wireless docking center 6 utilizes communication unit 64 to wirelessly communicate with an external device. For instance, wireless docking center 6 may utilize communication unit 64 to wirelessly communicate with communication unit 24 of wireless dockee 4 over wireless communication channel 8. In some examples, communication unit 64 may receive input from other components of wireless docking center 6, such as communication module 74, which cause communication unit 64 to wirelessly communicate with an external device.

In some examples, communication module 74 may manage communications between wireless docking center 6 and an external device, such as wireless dockee 4. For instance, communication module 74 may connect to a network hosted by wireless dockee 4. In some examples, communication module 74 may exchange data with wireless dockee 4. As one example, communication module 74 may transmit data such as peripheral data to wireless dockee 4. In some examples, communication module 74 may receive the transmitted information from other components of wireless docking center 6. For example, communication module 34 may receive peripheral data from one or more of peripheral service modules 80.

Wireless docking center 6, in some examples, may also include one or more UI devices 66. In some examples, one or more of UI devices 66 can be configured to output content, such as media data. For instance, one or more of UI devices 66 may be configured to display video data at a display such as a peripheral display 10 and/or output audio data from speakers, such as peripheral speakers 10. In addition to outputting content, one or more of UI devices 66 may be configured to receive tactile, audio, or visual input. Some examples of UI devices 66 include video displays, speakers, keyboards, touch screens, mice, cameras, and the like. In some examples, one or more of UI devices 66 may be included in peripherals 10.

Wireless docking center 6, in some examples, may also include UI module 72. UI module 72 can perform one or more functions to receive, content, such as UI data from other components associated with wireless docking center 6 and cause one or more of UI devices 66 to output the content. In some examples, UI module 72 may be configured to receive an indication of input, such as user input, and send the indications of the input to other components associated with wireless docking center 6, such as WDM 76. Using the data, UI module 72 may cause other components associated with wireless docking center 6, such as one or more of UI devices 66, to provide output based on the data.

One or more storage devices 68 may be configured to store information within wireless docking center 6 during operation. One or more of storage devices 68, in some examples, may comprise a computer-readable storage medium. In some examples, one or more of storage devices 68 may comprise a temporary memory, meaning that a primary purpose of one or more of storage devices 68 is not long-term storage. One or more of storage devices 68, in some examples, may comprise a volatile memory, meaning that one or more of storage devices 68 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 68 is used to store program instructions for execution by processors 62. One or more of storage devices 68, in one example, may be used by software or modules running on wireless docking center 6 (e.g., UI module 72, communication modules 74, WDM 76, peripheral service modules 92, and ASP module 94) to temporarily store information during program execution.

One or more of storage devices 68, in some examples, may also include one or more computer-readable storage media. One or more of storage devices 68 may further be configured for long-term storage of information. In some examples, one or more of storage devices 68 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Each of application modules 78 may represent an application provided by an entity that manufactures wireless docking center 6 or software operating on wireless docking center 6 or an application developed by a third-party for use with wireless docking center 6. Examples of application modules 78 may include applications for travel routing, maps, audio and/or video presentation, streaming video delivery and presentation, word processing, spreadsheets, voice and/or calls, weather, etc.

Wireless docking center 6, in some examples, may also include an ASP module 94 which may be configured to coordinate the discovery of services and manage the connections and sessions between wireless docking center 6 and wireless dockee 4. In some examples, ASP module 94 may receive method calls from one or more other components of wireless docking center 6, such as WDM 76. In some examples, ASP module 94 may provide event notifications to one or more other components of wireless docking center 6, such as WDM 76.

Wireless docking center 6, in some examples, may also include peripheral service modules 92 which may be configured to provide a peripheral service to a corresponding peripheral service module of wireless dockee 4. Some example peripheral services which may be provided by one or more of peripheral service modules 92 include, but are not limited to, a display service, a Wi-Fi serial bus (WSB)

service, a printing service, and an audio service. In some examples, one or more of peripheral service modules 92 may be configured to exchange peripheral service session communications, which may include peripheral function data, with a corresponding peripheral service module of peripheral service modules 52.

Wireless docking center 6, in some examples, may also include WDM 76 which may perform one or more functions to wirelessly dock wireless dockee 4 with wireless docking center 6, such that wireless dockee 4 may access one or more peripheral functions (PFs) associated with wireless docking center 6 (e.g., one or more of peripherals 10). In some examples, WDM 76 may include discovery module 80, setup module 82, control module 84, wireless docking environment module 86, authentication module 88, and teardown module 90.

WDM 76 may include discovery module 80 which may be configured to perform docking pre-association discovery with wireless dockee 4 to provide information related to the wireless docking center. For instance, discovery module 80 may provide information related to one or more peripherals associated with wireless docking center 6 to discovery module 40 of wireless dockee 4. In some examples, discovery module 80 may provide the information to wireless dockee 4 via a wireless link. In some examples, the information may indicate one or more characteristics of wireless docking center 6. Some example characteristics which may be indicated by the information include, but are not limited to, a device type that indicates whether wireless docking center 6 is a wireless dockee type device or a wireless docking center-type device, a device name that indicates a friendly name of wireless docking center 6, a device availability status that indicates whether or not wireless docking center 6 is available, an indication of one or more peripherals associated with wireless docking center 6, and one or more docking environment types (e.g., one or more wireless docking environment s) stored at wireless docking center 6.

WDM 76 may include setup module 82 which may be configured to setup a wireless docking connection between wireless docking center 6 and wireless dockee 4. As one example, setup module 82 may configured to establish a docking session between wireless docking center 6 and wireless dockee 4 via a direct wireless connection between wireless docking center 6 and wireless dockee 4. In some examples, setup module 82 may be configured to perform docking connection setup exchange between wireless docking center 6 and wireless dockee 4. In some examples, setup module 82 may be configured to perform docking ASP (application service platform) session setup between wireless docking center 6 and wireless dockee 4.

WDM 76 may include control module 84 which may be configured to manage one or more peripherals 10 associated with wireless docking center 6. As one example, control module 84 may exchange docking configuration and control protocol communications with wireless dockee 4. For instance, control module 84 may be configured to process a request to select one or more of the peripherals 10 associated with wireless docking center 6 received from wireless dockee 4.

WDM 76 may include wireless docking environment module 86 which may be configured to manage the selection/creation/modification/deletion of one or more wireless docking environments (WDNs) 2 that each correspond to one or more peripherals 10. For instance, wireless docking environment module 76 may create a new wireless docking environment 2 responsive to receiving a request to create the new wireless docking environment from wireless dockee 4.

WDM 76 may include access control module 88 which may be configured to perform one or more operations to obtain access rights to one or more of peripherals 10. For instance, access control module 88 may be configured to perform a user type authentication procedure with wireless dockee 4 by receiving user credentials from wireless dockee 4. In some examples, the user credentials may include a user type and a passphrase.

WDM 76 may include teardown module 90 which may be configured to tear down a wireless docking connection between wireless docking center 6 and wireless dockee 4. As one example, teardown module 90 may perform docking ASP (application service platform) session teardown between wireless docking center 6 and wireless dockee 4. In some examples, teardown module 90 may be configured to perform the teardown procedure in response to not receiving a keep-alive signal from wireless dockee 4 in a period of time (e.g., 10 seconds, 30 seconds, or 5 minutes).

Example wireless docking techniques that can be used with a wireless dockee 4 and a wireless docking center 6 and example techniques for communication between a wireless dockee and a peripheral in a wireless docking environment are described in U.S. patent application Ser. No. 14/265,833, entitled "Wireless Docking Architecture," filed Apr. 30, 2014, the descriptions of which is incorporated herein by reference.

In some example approaches, the docking services (i.e., WDM 36 and WDM 76) may use the ASP modules 54 and 94 to perform pre-association device and service discovery. If the docking service provided by wireless docking center 6 matches the interests of wireless dockee 4, the docking service on wireless docking center 6 and the docking service on wireless dockee 4 may use the ASP to perform a P2P provision discovery procedure and subsequently form a P2P group that includes wireless docking center 6 and the wireless dockee 4. An ASP Session may then be created for the Docking session between wireless docking center 6 and wireless dockee 4.

Once the ASP session for the docking services is set up, a docking configuration and control protocol may run over the connection of the docking ASP session. The docking configuration and control protocol may be used for post-association PF/WDN discovery, PF/WDN selection and configuration for PF Services. In some examples, before the PF/WDN selection and configuration is completed, the Docking Service may block a wireless dockee's access to all its peripheral services.

Upon the completion of the PF/WDN selection and configuration, in some example approaches, the docking service at wireless docking center 6 may allow wireless dockee 4 to access those services that wireless docking center 6 has agreed to offer. Wireless dockee 4 and wireless docking center 6 may perform a peripheral service setup procedure. The peripheral service setup procedure may in turn include potential peripheral connection setup, and peripheral ASP Session setup.

Wireless dockee 4 may undock from wireless docking center 6 at any time. For instance, a docking session teardown procedure may be triggered which may cause the docking services to close the ASP session of each individual PF Service between wireless docking center 6 and wireless dockee 4.

Document retrieval in a wireless docking system based on a query image will be discussed next. In one example approach, in a wireless docking system, a wireless dockee (WD) acquires an image, initiates a wireless connection with a wireless docking center (WDC) having one or more peripheral functions (PFs), and transfers the image to the wireless docking center via the wireless connection. The wireless docking center receives the image, determines attributes associated with the acquired image and returns, to the wireless dockee, information representative of matching documents stored on one or more of the peripheral functions. In some example approaches, the matching documents include images with attributes similar to the attributes associated with the acquired image. The wireless dockee selects, as a function of the information representative of the matching documents, one or more of the matching documents and retrieves the selected matching documents from the peripheral function or functions that are storing the documents.

In another example approach, in a wireless docking system, a wireless dockee (WD) acquires an image, determines attributes associated with the acquired image, initiates a wireless connection with a wireless docking center (WDC) having one or more peripheral functions (PFs), and transfers information including the acquired image attributes to the wireless docking center via the wireless connection. The wireless docking center receives the information from the wireless dockee and returns, to the wireless dockee, information representative of matching documents stored on one or more of the peripheral functions. In some example approaches, the matching documents include images with attributes similar to the attributes associated with the acquired image. The wireless dockee selects, as a function of the information representative of the matching documents, one or more of the matching documents and retrieves the selected matching documents from the peripheral function or functions that are storing the documents.

In some such example approaches, the information transferred from the wireless dockee to the wireless docking center includes the image, and the wireless docking center determines one or more further attributes from the image that are used with the attributes transferred by the wireless dockee to select matching documents.

As noted above, in some examples, attributes of the acquired image are analyzed and the attributes are used to locate similar images in documents stored on a peripheral device communicatively connected to the wireless docking center. In some such examples, the image recognition part of the system is realized by a vocabulary based image recognition application. Techniques such as Scale-Invariant Feature Transform (SIFT) or Speeded-Up Robust Features (SURF) may be used. In some example approaches such applications are made more robust via geometric consistency. In some examples, the system and method may be used to obtain instant access to the requested document in a large set of documents.

In one example approach, an image analysis technique such as vocabulary based image recognition is used to recall a query image in a large set of images. In some example approaches the captured query image includes perspective deformations of around 45 degrees of tilt from frontal capture location and up to 4× smaller resolution than the original database image. This adds robustness to the system, allowing the user to capture the query image from various viewpoints and still recall the corresponding slides.

In some example approaches, the system may be trained and used in various environments such as a wireless docking center capable of accessing a variety of personal storage devices. An application trained to access documents in such peripheral storage devices may be used, for example, by a mobile phone connected to the wireless docking center to retrieve particular documents as a function of an image acquired by the mobile phone.

In some example approaches, determining attributes associated with the acquired image includes extracting descriptors of the acquired image, generating one or more indices representative of documents that have images that best fit the acquired image and submitting the generated indices to a database of documents. Some or all of these functions may be performed in wireless dockee 4.

In some example approaches, selecting matching documents includes displaying, on the WD, indicia representing one or more of the matching documents found by the WDC to have images with attributes similar to the acquired image and receiving, at the WD, user input indicating the matching documents to be retrieved from the one or more matching documents found by the WDC.

In some example approaches, determining attributes for the acquired image includes transmitting the acquired image to the WDC for attribute extraction. Selecting matching documents includes displaying, either on WD 4 or on a peripheral display 10, indicia representing one or more of the matching documents found by the WDC to have images with attributes similar to the acquired image and receiving, from a user, user input indicating the matching documents to be retrieved from the one or more matching documents found by the WDC.

In one example approach, the technique further includes indexing documents on one or more peripherals 10 based on vocabulary.

In one example approach, a user starts the application, which loads an already learned vocabulary to the memory of a computing device. A user captures the query image of a printed copy of the document or a figure and submits the captured query image to the computing device. An application executing on the computing device receives the captured query image with, in some cases, descriptors and submits the information to the computing device. The computing device returns access to the soft copy of the figure or to figures similar to the query image. In some example approaches, the computing device returns access to the soft copy of documents that include the figure and, in some cases, to documents with figures similar to the query image. The user can then select the document they are interested in from the list of similar figures and documents and initiate a corresponding PowerPoint or document processing application.

The application, therefore, allows users to instantly access a soft copy of a printed document by simply capturing the image of the query. The system is robust to large perspective deformations, increasing the likelihood that the query image is recognized even when the figure is captured without significantly constraining the camera capture position.

Figure 6:
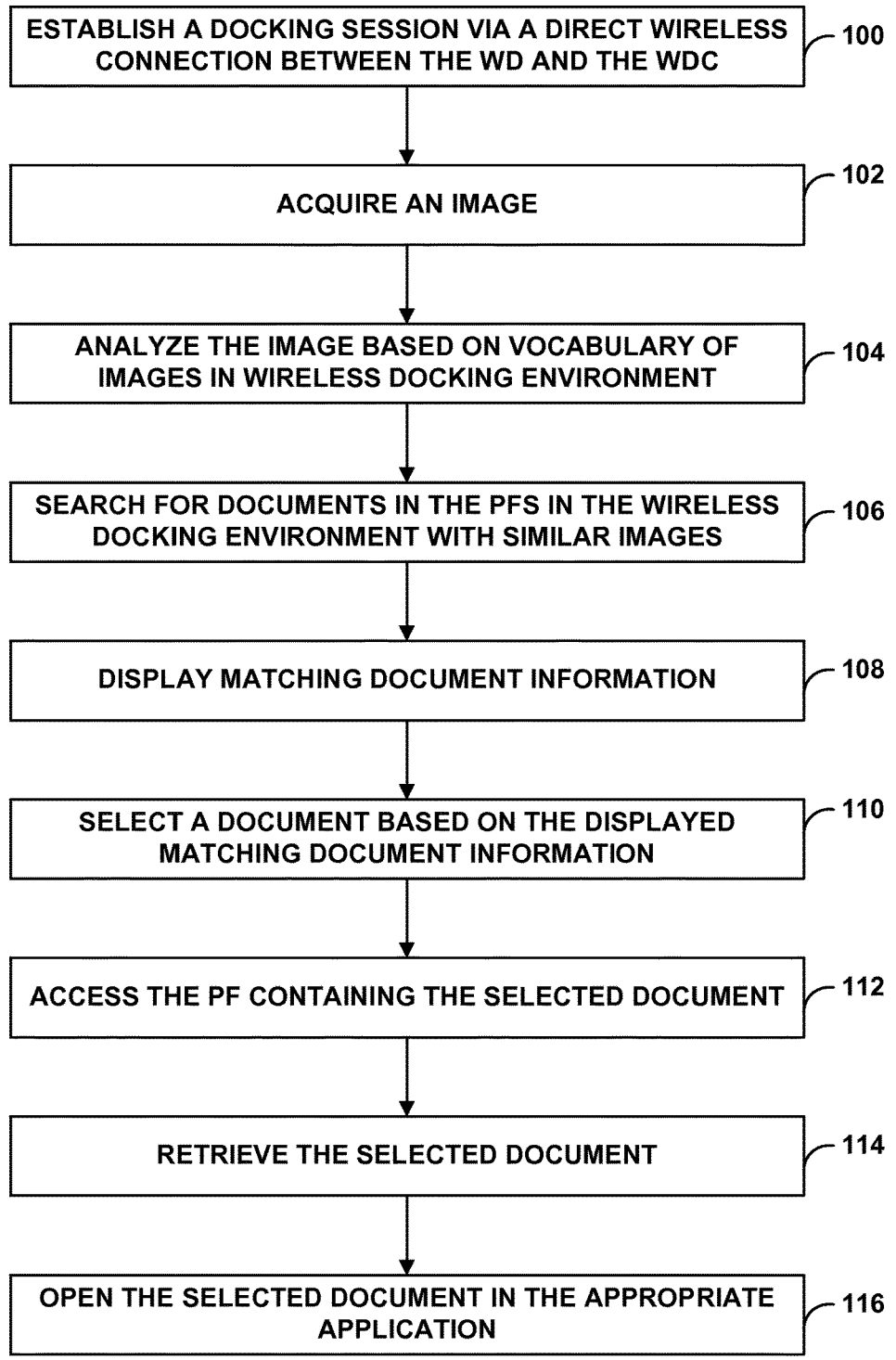
FIG. 6 is a flow diagram illustrating a technique for retrieving one or more documents based on an acquired image, in accordance with one or more techniques of the present disclosure.

In one example approach, as illustrated in FIG. 6, a wireless dockee 4 such as a smart phone establishes a docking session with wireless docking center 6 via a direct wireless connection between wireless dockee 4 and wireless docking center 6 (100). In one such approach, WD 4 uses this procedure to determine which ones of the one or more peripherals 10 are accessible via wireless docking center 6. In another such approach, wireless dockee determines which ones of the wireless docking environments 2 are accessible via wireless docking center 6.

In one example approach, wireless dockee 4 acquires an image to be used to search documents on one or more of the peripherals 10 or on their respective peripheral functions (102). For example, a user may want to access all documents that include a particular figure. The user may, in one example approach, capture an image of the figure with camera 14 and submit the captured image as a query image.

In some example approaches, the image is read from a memory in wireless dockee 4.

In one example approach, the acquired image is analyzed based on a vocabulary to identify features of the acquired image that have counterparts in the database (104). In one such embodiment, the vocabulary used is limited to images stored in a particular wireless docking environment. In one example approach, the vocabulary for all the images in a peripheral 10 is stored at the peripheral 10. In another example approach, the vocabulary for the images in a peripheral 10 is stored as a separate file for each peripheral in wireless docking center 6.

In some example approaches, wireless dockee 4 maintains a database of relevant documents and searches for documents in the database that have images or components of images similar to the acquired image (106). In one such example approach, the database is compiled as part of establishing the docking session and is indexed using a vocabulary.

In one example approach, a mobile phone performs image processing and descriptor extraction and transfers the descriptors to wireless docking center 6. In some such approaches, the phone also matches a vocabulary associated with the images stored in the image database and transfers the matches to wireless docking center 6. The indices may be used by wireless docking center 6 to query the database stored in wireless docking center 6. The result is a list of the documents stored on the peripherals that are similar in some way to the query image. In one example approach, matching document information is displayed (108). For example, the documents may be displayed as thumbnails on a wireless dockee display (108). In one example approach, a number is displayed next to each thumbnail. The number represents the likelihood that the image is present in the underlying document. For example, a higher number may indicate a higher likelihood.

In another example approach, wireless docking center 6 maintains a database of relevant documents and searches for documents in the database that have images or components of images similar to the acquired image (106). In one such example approach, the database is compiled as part of establishing the docking session.

In one such approach, smart phone 4 performs image processing and descriptor extraction. In some such approaches, phone 4 also generates indices and uses the indices to query the database in wireless docking center 6 for relevant documents stored in the peripherals. The result is a list of the documents stored on the peripherals that are similar in some way to the query image. In one example approach, the matching document information is displayed (108). For example, documents may be displayed as thumbnails on a wireless dockee display. In one example approach, a number is displayed next to each thumbnail. The number represents the likelihood that the image is present in the underlying document.

In another such approach, smart phone 4 transfers the acquired image to wireless docking center 6 and wireless docking center 6 performs image processing and descriptor extraction on the acquired image. In some such approaches, wireless docking center 6 generates indices and uses the indices to query the database in wireless docking center 6 for relevant documents stored in the peripherals. The result is a list of the documents stored on the peripherals that are similar in some way to the query image. In one example approach, matching document information is displayed (108). For example, the documents are displayed as thumbnails on a wireless dockee display (108). In one example approach, a number is displayed next to each thumbnail. The number represents the likelihood that the image is present in the underlying document.

In some such approaches, smart phone 4 performs some image processing and descriptor extraction and transfers both the image and the results of the image processing and descriptor extraction to wireless docking center 6. In one example approach, wireless docking center 6 performs additional processing on the acquired image to extract further attributes and then queries the database to find documents or images with the combination of attributes.

In the approach shown in FIG. 6, a user selects the desired document from the documents listed (110) and accesses the peripheral 10 that contains the document (112). As noted above, in some example approaches, wireless docking center 6 may include peripheral service modules 92 which may be configured to provide a peripheral service to a corresponding peripheral service module of wireless dockee 4. In some examples, one or more of peripheral service modules 92 may be configured to exchange peripheral service session communications, which may include peripheral function data, with a corresponding peripheral service module of peripheral service modules 52. In one document retrieval example, one or more peripheral service modules 52 receive selected documents retrieved from their corresponding peripherals 10 by one or more peripheral service modules 92 (114).

Wireless dockee 4 then, in some example approaches, opens the retrieved document or documents in the appropriate application (116). A PowerPoint document is opened, for example, in a PowerPoint application or in an equivalent program while a word processing document is opened in a word processing application.

In some example approaches, some or all of the processing of the query image is performed in wireless docking center 6. For instance, wireless docking center 6 may, for example, maintain the database of relevant documents and perform some or all of the tasks needed to search for documents in the database (106). In one such example approach, the database is compiled as part of associating each peripheral 10 with wireless docking center 6. In one example approach, a database is stored in each peripheral with data relevant to the documents stored in that peripheral 10 and the database is transferred to wireless docking center 6 when the peripheral is connected to wireless docking center 6.

In one example approach, after a mobile phone performs image processing and descriptor extraction, it transfers these attributes to wireless docking center 6. In other such approaches, the phone generates indices relevant to the descriptors and transfers the indices to wireless docking center 6 for use in querying the database of relevant documents stored in wireless docking center 6. The result is a list of the documents stored on the peripherals that are similar in some way to the query image. In one example approach, information on the documents is transferred to wireless dockee 4 and, in some approaches, the documents are displayed as thumbnails on a wireless dockee display (108).

In one example approach, a researcher takes a picture of a figure or image in a book or magazine using camera 14 of her smart phone 4. Attributes of the acquired image are analyzed to generate image attributes such as descriptors and the attributes are used to query a database on smart phone 4. One or more candidates for the document are displayed on smart phone 4 and the researcher can select the one matching the book or magazine. The researcher can continue to perform her research using the book or magazine and then switch to a soft copy of the book or article when docked to a docking center 6. For instance, the researcher might be reading a rare manuscript, and may want to continue her research after leaving the library. The present technique provides a way of doing so as long as a copy of the manuscript is in the library.

Similarly, a speaker might be preparing a presentation on his tablet, and wants to access another presentation having a similar figure. He would take a picture of the figure, search a database of his past presentations and receive a list of one or more documents that have a similar figure. In some example approaches, a smaller database of presentations is maintained on the tablet and used to search for documents having the desired figure. If a match is found, the document with the figure is accessed when the user next docks to docking center 6.

Figure 7:
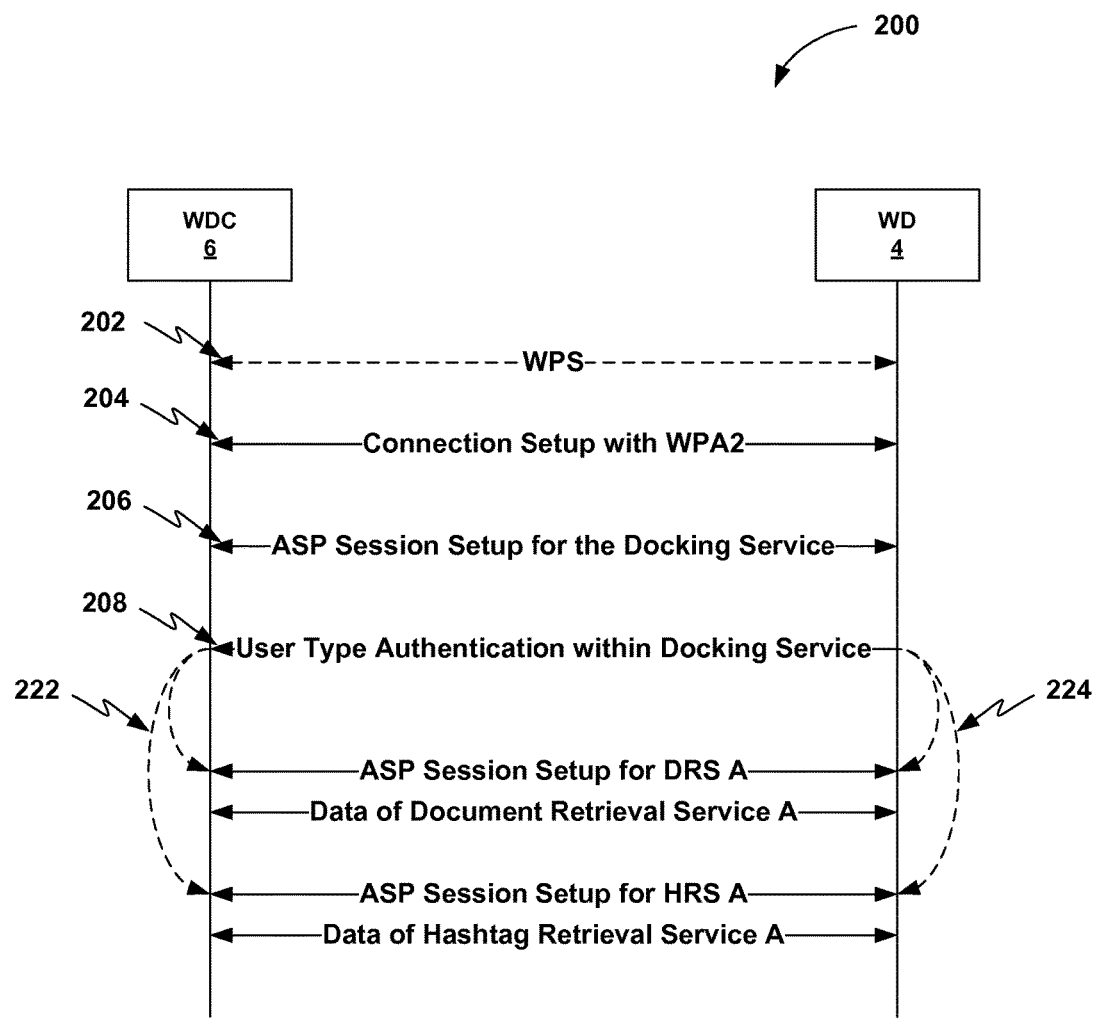
FIG. 7 is a communication flow diagram illustrating an example data flow between a wireless dockee and a WDC performing techniques to wirelessly dock and transfer a search based on an acquired image, in accordance with one or more examples of this disclosure.
Figure 8:
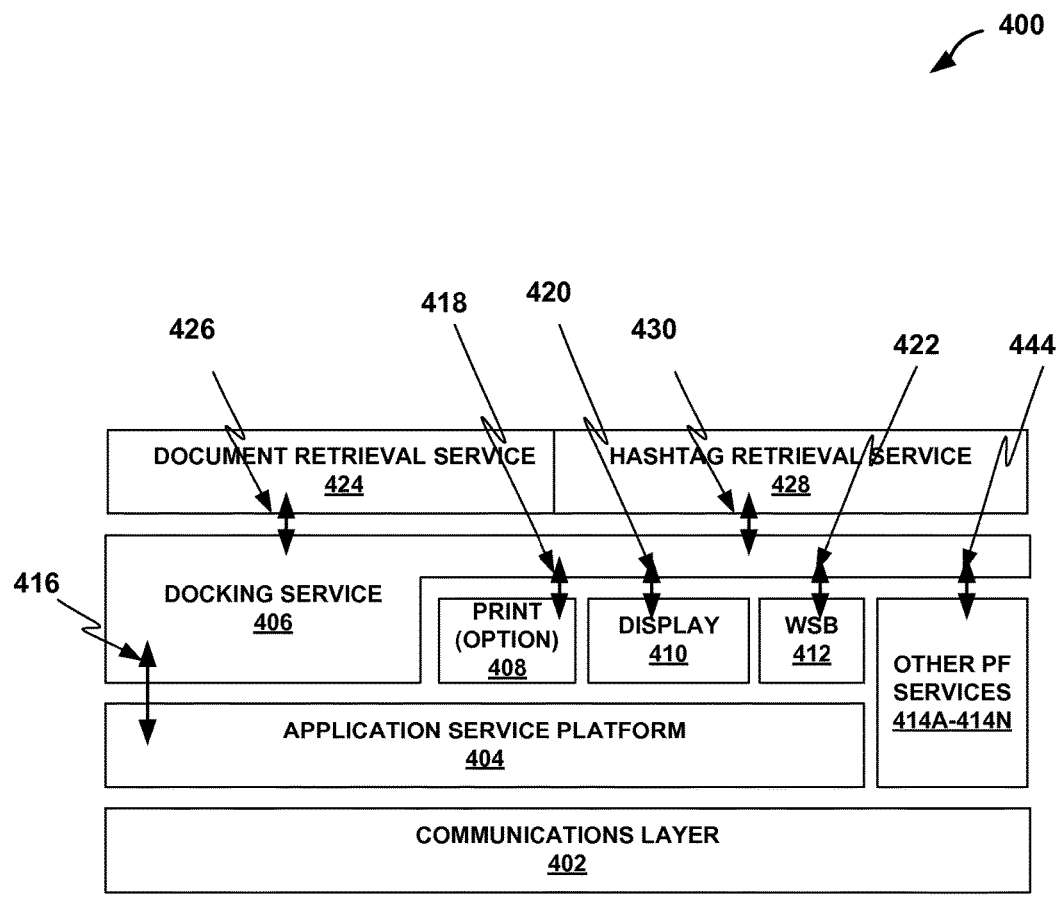
FIG. 8 is a conceptual diagram illustrating an example wireless docking architecture that may be implemented by a wireless docking device, in accordance with one or more techniques of this disclosure.

FIG. 7 is a communication flow diagram illustrating an example data flow between a wireless dockee and a WDC performing techniques (200) to wirelessly dock and transfer a search based on an acquired image, in accordance with one or more examples of this disclosure. The techniques of FIG. 7 may be performed by a WD and a WDC, such as WD 4 and WDC 6 illustrated in FIG. 1 and FIG. 2. For purposes of illustration, the techniques of FIG. 7 are described within the context of WD 4 and WDC 6 of FIG. 1 and FIG. 2, although computing devices having configurations different than that of WD 4 and WDC 6 may perform the techniques of FIG. 7.

In accordance with one or more techniques of this disclosure, WD 4 and WDC 6 may exchange communications as follows. WD 4 and WDC 6 may exchange Wi-Fi Protected Setup (WPS) information (202). For example, the user may push a button, enter a PIN, or touch an NFC interface. In some examples, WD 4 and WDC 6 may exchange the WPS information only during their first connection. WD 4 and WDC 6 may then exchange connection setup information with Wi-Fi Protected Access 2 (WPA2) (204). In some examples, WD 4 and WDC 6 may exchange the connection setup information in response to a trigger, such as triggered WPS or by selecting an icon on a UI. WD 4 and WDC 6 may then exchange ASP session setup information for the docking service (206). WD 4 may then communicate user type authentication information within the docking service to WDC 120 (208).

WD 4 and WDC 6 may then exchange ASP session setup information and Peripheral Data for various PF Services (e.g., Document Retrieval Services A, B, etc.). As illustrated in FIG. 7, the user type authentication information may control the admission of ASP session setup for individual peripheral services (222), and/or trigger ASP session setup for individual peripheral services (224). In one example approach, such as is shown in FIG. 7, an ASP Session is set up for a Document Retrieval Service (DRS) A used to retrieve one or more documents with features similar to the features of an acquired image. In another example approach, such as is shown in FIG. 7, an ASP Session is set up for a Hashtag Retrieval Service (HRS) A used to retrieve one or more hashtags relevant to features of an acquired image.

In some examples, such as where WD 4 is not allowed to access a certain PF Service, docking as the application from the perspective of its interfaced PF Service shall not accept the ASP session setup for the corresponding PF Service. Upon the completion of the PF Service setup, WD 4 can use the PF Service(s) at WDC 6.

In one example approach, Document Retrieval Service A includes the transfer of the acquired image to the wireless docking center, where the features of the acquired image are extracted and used to search a database of documents. Documents matching the acquired image are presented to the user.

In one example approach, Document Retrieval Service B includes the the image processing of the acquired image at the wireless dockee to extract attributes (such as descriptors) relevant to the image and the transfer of the attributes associated with the acquired image to the wireless docking center, where the attributes and used to search a database of documents. Documents matching the acquired image are presented to the user.

Document Retrieval Service A might be used, for example, where wireless dockee has limited computing power, while Document Retrieval Service B might be used where wireless docking center 6 has a lighter load, or where WD 4 has more processing power.

In one example approach, as noted above, WD 4 includes a docking service, an application service platform (ASP) and one or more peripheral services. Each peripheral service communicates with at least one PF 10 of the one or more PFs 10 associated with WDC 6. In one such example approach, WD 4 displays, via ASP module 54, information representative of one or more of the matching documents and receives, via ASP module 54, user input indicating the selected matching documents. WD 4 then retrieves the selected matching documents from their PFs 10 via their corresponding peripheral services.

In one example approach, wireless dockee 4 includes a memory, one or more processors, a docking service module executable by the one or more processors to perform a plurality of operations to wirelessly dock with a wireless docking center (WDC) such that the WD may access one or more peripheral functions (PFs) associated with the WDC, one or more peripheral service modules that each correspond to at least one PF of the one or more PFs associated with the WDC and an application service platform (ASP) module. The ASP module is executable by the one of more processors to acquire an image, to determine attributes associated with the acquired image, to receive, from the WDC, information representative of matching documents stored on one or more of the PFs, to select, as a function of the information representative of the documents, one or more of the matching documents, and to receive the selected matching documents when retrieved from the corresponding PFs. In one example approach, matching documents are those documents that include images with attributes similar to the attributes associated with the acquired image.

In one example approach, the docking service module of WD 4 is executable by the one or more processors to seek a corresponding docking service of the WDC, to determine the one or more PFs associated with the WDC and to establish a docking session via a direct wireless connection between the WD and the WDC. In one such approach, the docking service module is executable by the one or more processors to trigger a peripheral service of the one or more peripheral services of the WD to use a corresponding peripheral service of the WDC and to configure the peripheral service for use by the WD.

In one example approach, WD 4 further includes a camera and the ASP module is executable by the one or more processors to acquire an image via the camera.

Figure 9:
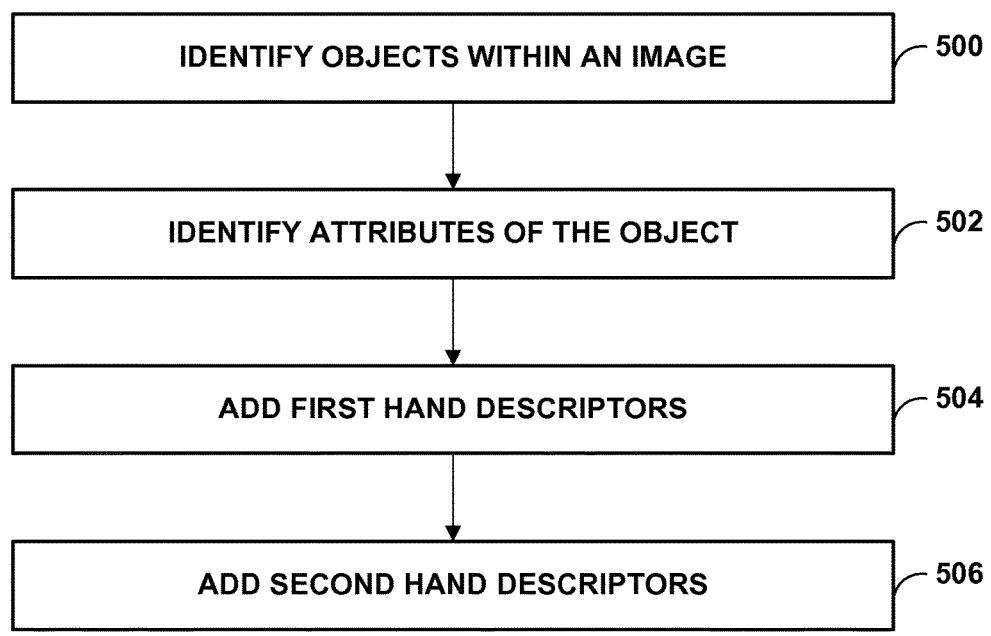
FIG. 9 is a flowchart illustrating an image recognition technique, in accordance with one or more examples of this disclosure.

FIG. 9 a conceptual diagram illustrating example wireless docking architecture 400 that may be implemented by a wireless docking device, in accordance with one or more techniques of this disclosure. Examples of wireless docking devices which may include architecture 400 are wireless dockees (such as WD 4 of FIG. 1 and FIG. 2) and wireless docking centers (such as WDC 6 of FIG. 1 and FIG. 2).

As illustrated in FIG. 9, architecture 400 may include communications layer 402 (e.g., Wi-Fi Direct/TDLS/Infrastructure/802.11n/ac/ad), application service platform (ASP) 404, docking service 406, print service 408, wireless display service 410 (e.g., Miracast), Wi-Fi Serial Bus (WSB) service 412, one or more other peripheral services 414A-414N (collectively, "peripheral services 414"), document retrieval service (DSR) 424 and hashtag retrieval service (HRS) 428.

As illustrated in FIG. 9, architecture 400 may define a plurality of interfaces through which docking service 406 may manage one or more other components of architecture 400. For instance, docking service 406 may manage ASP events and methods with ASP 404 via interface 416, manage print service 408 via interface 418, manage wireless display service 410 via interface 420, manage WSB 412 via interface 422, and manage peripheral services 414 via interface 444. Document retrieval service 424 communicates with a wireless docking center 6 through docking service 406 via interface 426. Hashtag retrieval service 428 communicates with a wireless docking center 6 through docking service 406 via interface 430.

Docking service 406 may utilize the interfaces and events provided by ASP 404 to perform service discovery and session setup between a WD and a WDC. Where architecture 400 is implemented by a WDC, interface 416 between the docking service 406 and ASP 404 may enable docking service 406 at the WDC to perform one or more of: advertising docking service 406 (including peripherals managed by docking service 406) and capabilities required to drive the use of its peripheral functions) and enable a WD to wirelessly connect to the WDC. Where architecture 400 is implemented by a WD, interface 416 between the docking service 406 and the ASP 404 may allow docking service 406 at the WD to perform the one or more of: seeking the docking service 406 at a WDC (including peripherals managed by WDC and capabilities required to drive the use of its peripherals), and wirelessly connect to the WDC.

Docking service 406 may include a docking configuration and control protocol, which may be used by a WD to configure its docking session provided by a WDC, as described above.

As noted above, document retrieval service 424 communicates with a wireless docking center 6 through docking service 406. In one such approach, WSB service 412 is used as a transport service between document retrieval service 424 and WDC 6. In some approaches, WSB service 412 is used to convey parameters such as bandwidth or latency between DRS 424 and WDC 6. A similar mechanism may be used for hashtag retrieval service 428 as well.

A peripheral service (e.g., PF Services 414) may or may not be deployed directly on top of ASP 404. Docking service 406 may communicate with the PF Services on the same docking device, serving as a management entity on top of the PF Services. Where architecture 400 is implemented by a WDC, interface 416 between docking service 406 and PF Services (e.g., print, display and WSB), may allow docking service 406 at the WDC to perform one or more of: activate and deactivate a peripheral service, control the WD's access to a peripheral service at the WDC, and configure the PF Service for a WD's use. Where architecture 400 is implemented by a WD, interface 416 between docking service 406 and PF Services (e.g., print, display and WSB), may allow docking service 406 to perform one or more of: triggering a peripheral service at the WD to seek and use the corresponding peripheral service at a WDC, and configuring the PF Service for a WD's use.

In some examples, one or more XML elements may be transmitted by WD 4 or WDC 6 when performing procedures such as a peripheral query procedure, a peripheral selection and configuration procedure, a peripheral change notification procedure, a WDN query procedure, a WDN selection procedure, a WDN change notification procedure, a user type authentication procedure, a WDN creation procedure, a WDN modification procedure, or a WDN deletion procedure. Further discussion of the use of XML elements to perform such procedures is described in U.S. patent application Ser. No. 14/265,833, entitled "Wireless Docking Architecture," filed Apr. 30, 2014, the description of which is incorporated herein by reference.

FIG. 10 is a flowchart illustrating an image recognition technique, in accordance with one or more examples of this disclosure. In one example approach, a vocabulary based search database is created having a dictionary of visual words in which a visual word is assigned to each object in every image in an image database. In some example approaches, wireless docking center 6 trains the dictionary by analyzing an image database stored in a peripheral 10 connected to wireless docking center 6. In some example approaches, wireless docking center 6 trains the dictionary by analyzing an image database stored in wireless docking center 6. And in some example approaches, a remote computing device creates the dictionary from an image database and downloads both database and dictionary to wireless docking center 6.

The dictionary then becomes a list of the objects that are recognized by the computing device. Each object in subsequent images is then broken into descriptors and the descriptors are compared to the visual words in the dictionary to determine the images in the image database that include similar objects. In one example approach, as is described above, descriptors are assigned automatically using an image analysis technique such as VBIRwGC, as is discussed above. In another example approach, descriptors such as those assigned automatically using an image analysis technique such as VBIRwGC are supplemented during dictionary development with first and second hand derived information, as will be discussed next.

In the example approach shown in FIG. 9, descriptors are attributes that may be augmented with first and second hand derived information. In one such example approach, first hand derived information includes descriptors directed to objects (e.g., a tree, the ground, the sky) found in the image, while the second hand derived information includes descriptors directed to combinations of objects in the image (e.g., a descriptor that describes some aspect of a relationship between, for example, the tree and the ground). One might determine by looking at the ground and the tree that it is winter, or that the area is suffering through a drought.

As can be seen in FIG. 9, the technique includes identifying objects within an image. In one example approach, a computing device identifies objects in an image (500) and identifies attributes of each object based on vocabulary based recognition software (502). Image recognition techniques such as SIFT, SURF or VBIRwGC work well at recognizing objects based on feature descriptors. In some such approaches, a geometric consistency check (such as in VBIRwGC) provides even better feature identification.

In one example approach an administrator identifies objects within a plurality of images, adds a descriptor for each object and saves the objects and descriptors in an image object dictionary. In one such example approach, the technique includes identifying objects within a plurality of images, wherein identifying includes adding a descriptor for each object and saving the objects and descriptors in an image object dictionary; assigning attributes to the objects; analyzing an image to determine objects and attributes to those objects within the image; adding descriptors to the objects; and adding, to an attribute of an object, first hand derived information relevant to the object in the image.

In one example approach, the user takes the identified attributes and assigns to one or more of the attributes associated with an object one or more first hand derived information entries relevant to the object (504). In one example approach, such as is shown in FIG. 9, the user also assigns one or more second hand derived information entries to aspects of the image that are relevant to more than one object (506).

In one example approach, a wireless dockee 4 docks to a wireless docking center 6 and receives the dictionary of image objects from wireless docking center 6. When wireless dockee 4 has an image to analyze, it breaks the image into objects and assigns descriptors to the objects. The objects and descriptors are presented to the user and the user is given the opportunity to augment the object attribute with first hand derived information. The first hand derived information becomes a part of the dictionary of image objects and, in some example approaches, is stored back to wireless docking center 6. The user is also given the opportunity to add second hand derived information based on combinations of objects in the image. Once again, the first hand derived information becomes a part of the dictionary of image objects and, in some example approaches, is stored back to wireless docking center 6. In some example approaches, a copy of the dictionary is maintain in a wireless docking environment 2 (in, for example, wireless docking center 6) and in each wireless dockee 4.

FIG. 10 illustrates an example of the technique described in FIG. 9. In the example shown in FIG. 10, the objects in column 600 are objects that have been recognized in the database of images. Similarly, the attributes in column 602 are the attributes that have been recognized for the objects in the database of images. In the example shown in FIG. 10, a user has entered first hand derived information (shown in in column 604) relative to an image for the type attribute of both a "tree" object and a "leaves" object. The user has also entered second hand derived information (shown in column 606) that is not directed to a specific object, or is directed to more than one object. Here, the entries are based on the combination of the objects "tree" and "leaves." In one example approach, the dictionary of image objects is updated to include the added first and second hand derived information.

An application of the above described techniques will be discussed next in the context of FIGS. 1-13. Instagram and other user generated content sharing applications are extremely popular. On many of these applications, users search for photographs through hash tags. Even a search for news often requires a search for particular hash tags. It is extremely important to tag appropriately with prevalent and relevant hash tags to attract more eyes.

At this time, a user has to add hash tags manually. A user may, for instance, add hash tags to an image and publish the image on Instagram, but the process of adding hash tags is subjective, labor intensive and not necessarily productive. The result may be less than effective in attracting eyes to your image.

Figure 11:
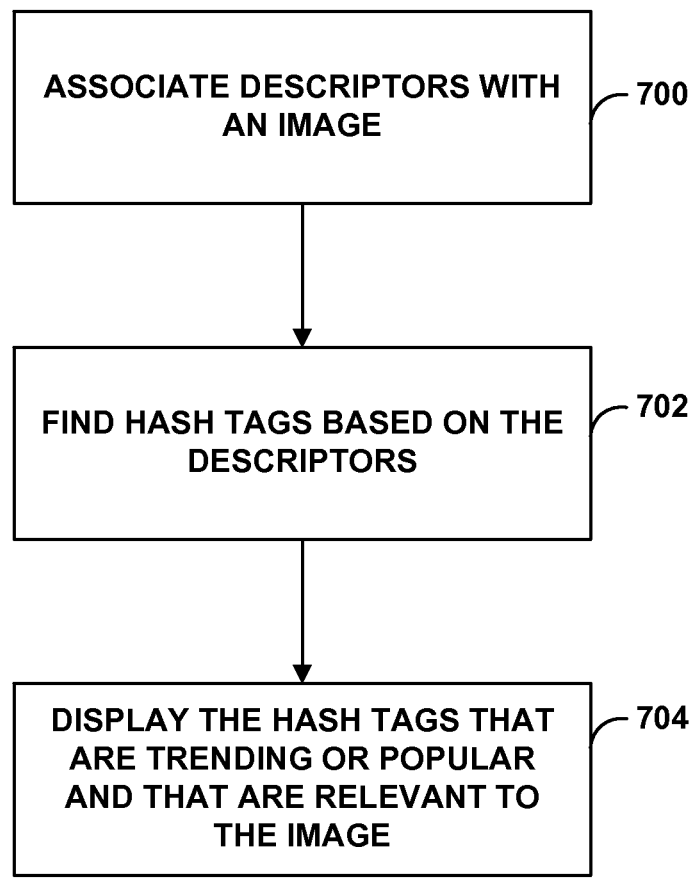
FIG. 11 illustrates a technique for attaching hash tags to an image, in accordance with one or more examples of this disclosure.

A process for finding features in an image, associating the features with descriptors and finding appropriate has tags based on the descriptors is illustrated in FIG. 11, in accordance with one or more examples of this disclosure.

In the example approach of FIG. 111, an image is analyzed and representative descriptors are associated with the image (600). A check is made to determine if there are hash tags corresponding to the descriptors and similar hash tags are selected (702). The selected hash tags are reviewed to determine if there is an indicia of importance (i.e., are the selected hash tags, for instance, trending or popular) (704).

In one example approach, descriptors associated with the image are augmented with first and second hand derived information as discussed in the context of FIG. 10 and the augmented descriptors are used to access the hash tag database.

In one example approach, a technique includes identifying objects within a plurality of images, wherein identifying includes adding a descriptor for each object and saving the objects and descriptors in an image object dictionary; assigning attributes to the objects; assigning descriptors to one or more of the attributes; analyzing an acquired image to determine objects in the image and the attributes of those objects within the image; comparing the descriptors of the objects and the descriptors of the attributes to a list of hash tags; and compiling a list of hash tags similar to the descriptors.

Figure 12:
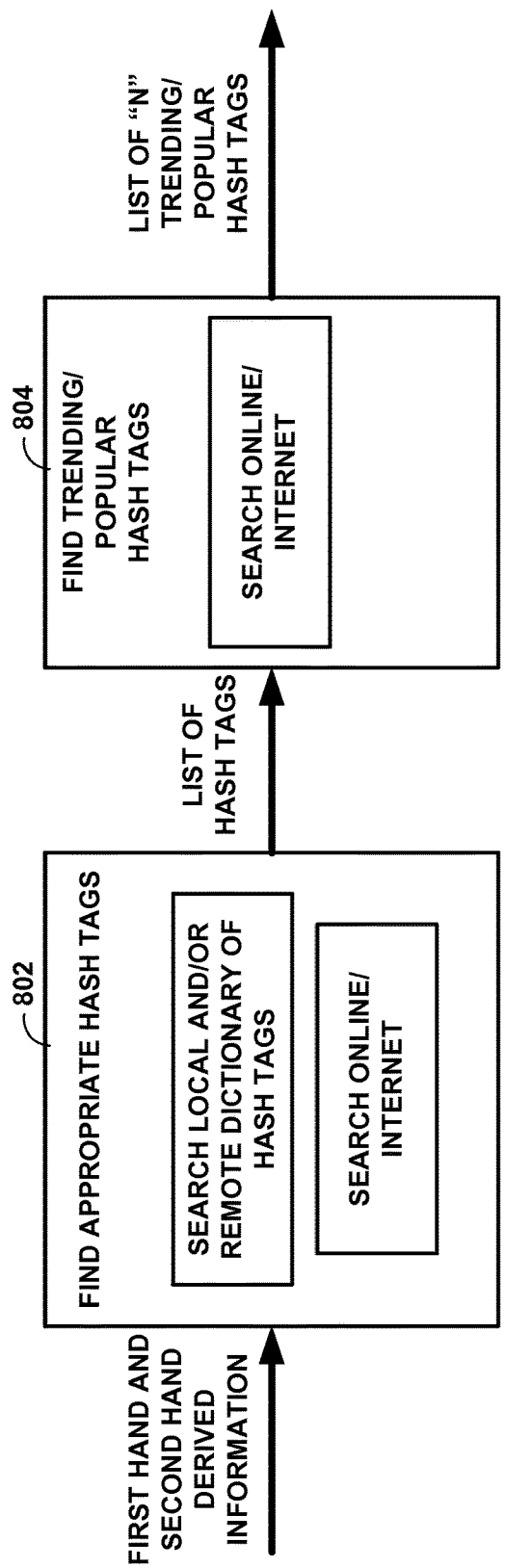
FIG. 12 illustrates another technique for attaching hash tags to an image.

FIG. 12 illustrates another technique for attaching hash tags to an image. In one example approach, a computing device receives augmented descriptors, including first and second hand derived information, describing an image and searches a database of hash tags for hash tags relevant to the augmented descriptors (802). The resulting list of hash tags is reviewed to highlight the hash tags that are trending and/or popular and a list of "n" tending/popular hash tags is produced (804). By publishing the image with the most popular or most trending hash tags, a user increases the likelihood that the image will be viewed.

In one example approach, the list of hash tags is presented in descending order of trending or popularity.

In one example approach, the computing device is a smart phone and the database of hash tags is a dictionary stored on the smart phone. In one such approach, the smart phone analyzes the image to obtain vocabulary based descriptor. A user then reviews the image and adds first hand and second hand descriptors as desired to generate an augmented set of descriptors. The augmented set of descriptors is then used to access the dictionary and retrieve and display relevant hash tags.

In another example approach, the computing device is a smart phone and the database of hash tags is a dictionary stored on a server on the cloud. In one such approach, the smart phone analyzes the image to obtain vocabulary based descriptor either alone, or in cooperation with the cloud-based server. A user then reviews the image and adds first hand and second hand descriptors as desired to generate an augmented set of descriptors. The augmented set of descriptors is then used to access the dictionary on the cloud-based server and to retrieve and display relevant hash tags.

In yet another example approach, the computing device is a smart phone and the database of hash tags is a dictionary stored on a wireless docking center 6, or on a peripheral 10 attached to wireless docking center 6. In one such approach, the smart phone analyzes the image to obtain vocabulary based descriptor either alone, or in cooperation with the wireless docking center 6. A user then reviews the image and adds first hand and second hand descriptors as desired to generate an augmented set of descriptors. The augmented set of descriptors is then used to access the dictionary on wireless docking center 6 to retrieve and display relevant hash tags.

In one example approach, the hash tag database is stored in a local directory of current hash tags. In one such example approach, the directory of current hash tags is updated periodically through queries, for example, to one or more of the websites that report trending hash tags. Information on trending hash tags can be found, for instance, at https://www.hashtags.org/trending-on-twitter/, http://hashtagify.me/popular, or http://top-hashtags.com/instagram/. Other sites can be found submitting an internet search for "tending hash tags."

In the example shown in FIG. 12, a computing device receives descriptor information associated with an image. In one example approach, the descriptor information includes verbal descriptors of objects within the image. In some example approaches, the verbal descriptors are augmented with first hand and second hand derived information as described above. The descriptor information is used to select appropriate hash tags for the image. As shown in FIG. 12, the result is a list of hash tags associated with features of the image.

In the example approach of FIG. 12, the list of hash tags is compared to a list of hash tags that are trending or popular, and a list of the top "n" trending/popular hash tags is identified.

In one example approach, a user starts a hash tag application, which loads an already learned vocabulary to the memory of a computing device. Users access the image they wish to publish and submit the image to the computing device. An application executing on the computing device receives the image with, in some cases, descriptors, and submits the information to the computing device. The computing device returns a list of descriptors associated with the image and a list of hash tags relevant to the descriptors. In one example approach, the descriptors constitute a verbal description of objects and combinations of objects in the image. The user can then select the hash tags they are interested in from the list of hash tags and publish the image with the selected hash tags.

In one example approach, the list of hash tags relevant to the descriptors is ordered by popularity. In another example approach, the list of hash tags relevant to the descriptors is ordered to highlight trending hash tags. In yet another example approach, the list of hash tags relevant to the descriptors that is presented to the user is ordered to take into account the popularity of the hash tags and whether they are trending.

The application, therefore, allows users to identify hash tags that are popular and/or trending with respect to their image and to publish the image with the appropriate hash tags to drive interest to the image.

In one example approach, hash tags are accessed as a function of first and second hand derived information.

Figure 13:
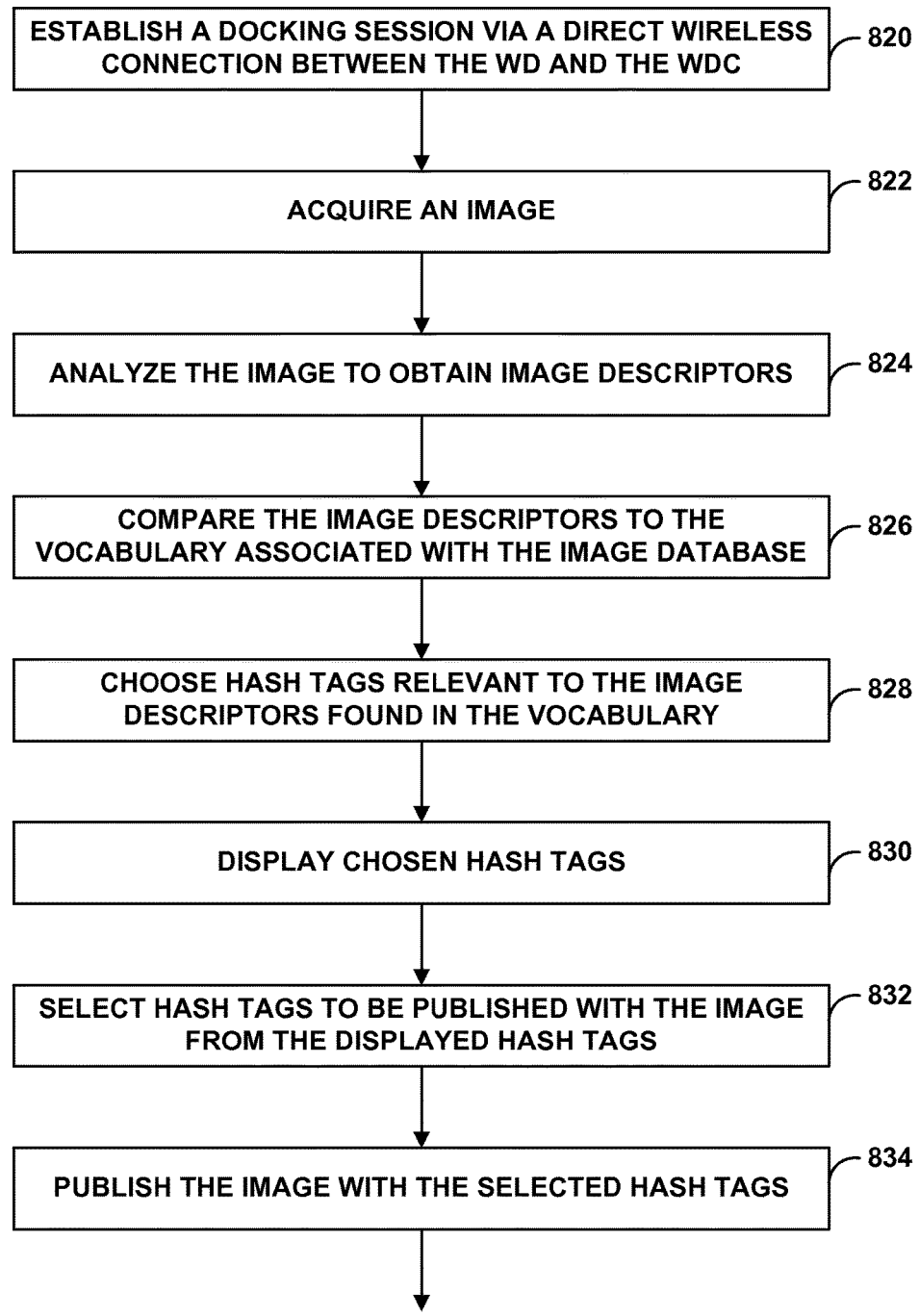
FIG. 13 is a flow diagram illustrating a technique for recognizing hash tags to be published with an image, in accordance with one or more techniques of the present disclosure.

In one example approach, a wireless docking system 1 is used to identify relevant hash tags. FIG. 13 is a flow diagram illustrating a technique for recognizing hash tags to be published with an image, in accordance with one or more techniques of the present disclosure. In the technique of FIG. 13, a wireless dockee 4 such as a smart phone establishes a docking session with wireless docking center 6 via a direct wireless connection between wireless dockee 4 and wireless docking center 6 (820). In one such approach, WD 4 uses this procedure to determine which ones of the one or more peripherals 10 are accessible via wireless docking center 6.

In another such approach, wireless dockee determines which ones of the wireless docking environments 2 are accessible via wireless docking center 6.

In one example approach, wireless dockee 4 acquires an image (822). The user may select the image from a portfolio of images, upload the image as a file, or capture the image with camera 14. In some example approaches, the image is read from a memory in wireless dockee 4.

In one example approach, the acquired image is analyzed to identify features of the acquired image that might have counterparts in the image database (824). In some such approaches, an image descriptor is associated with each feature.

In some example approaches, the analysis is done on a mobile device before the device is docked to a wireless docking station. In other example approaches, the analysis is done on a mobile device after the device is docked to a wireless docking station. In yet other example approaches, the analysis is done on a wireless docking station when the acquired image is transferred to the wireless docking station from a device docked to a wireless docking station. In yet other example approaches, the analysis split between a mobile device and a wireless docking station after the device is docked to the wireless docking station.

A check is made to determine if the descriptors associated with the acquired image match the vocabulary words associated with the image database (826). Again, this check may be performed by the wireless dockee 4, by wireless docking station 6 or by another device in wireless docking environment 2. In one example approach, the vocabulary used is limited to images in a particular wireless docking environment 2.

In one example approach, the vocabulary for all the images known to a peripheral 10 is stored at the peripheral 10. In another example approach, the vocabulary for all the images known to a peripheral 10 is stored as a separate file for each peripheral 10 in wireless docking center 6.

In some example approaches, wireless dockee 4 maintains a database of hash tags for relevant images and searches for those hash tags in the database that are associated with objects or combinations of objects from the image. Again, this search may be performed by the wireless dockee 4, by wireless docking station 6 or by another device in wireless docking environment 2. In one such approach, the device performing the search chooses tags relevant to the image descriptors found in the vocabulary (828). In one such example approach, the database is compiled as part of establishing the docking session and indexed, like the image database, using vocabulary indices. For example, in one approach, a database is stored in each peripheral with data relevant to the hash tags stored in that peripheral 10; the database is transferred to wireless dockee 4 at the start of each docking session. In another approach, a database is stored in the peripherals 10 attached to wireless docking center 6 and is transferred to wireless docking center 6 as part of the establishment of the docking session.

In one example approach, a mobile phone such as a smart phone performs image processing and descriptor extraction. In some such approaches, the phone also determines the descriptors that match the vocabulary developed for the image database stored in the wireless dockee. In some example approaches, the descriptors are augmented with first and second hand derived information as noted above and the augmented descriptors are used to access hash tags in the hash tag database. The result is a list of the hash tags relevant to the image that were stored on the peripherals in wireless docking system 1. In one example approach, the list is displayed to the user such that the user can select hash tags to be published with the image (830). In one such example approach, the list of chosen hash tags is displayed to the user in an order (such as, by example, trending order, popularity or relevance to the image) such that the user is guided in selecting hash tags to be published with the image (830). The user selects one or more hash tags to be published with the image from the displayed hash tags (832) and publishes the image with the selected hash tags (834).

In some approaches, the hash tag query is restricted to a particular wireless docking environment 2 and the result is a list of those hash tags relevant to the image that were stored on the peripherals in wireless docking environment 2.

In another example approach, wireless docking center 6 maintains a database of relevant hash tags and wireless docking center 6 searches for the hash tags in the database that apply to objects or combinations of objects similar to those in the image (826). In one such example approach, the database is compiled as part of establishing the docking session. For example, in one approach, a database is stored in each peripheral with data relevant to the documents stored in that peripheral 10 and the database is transferred to wireless docking center 6 at the start of each docking session.

In one such approach, smart phone 4 performs image processing and descriptor extraction. In some such approaches, phone 4 also determines the descriptors that match the vocabulary developed for image database and then uses indices associated with the matching vocabulary words to query the hash tag database in wireless docking center 6 for relevant hash tags. The result is a list of the most relevant or popular or trending hash tags that are relevant to the image. In one example approach, hash tags are displayed on a wireless dockee display. In one example approach, a number is displayed next to each hash tag. The number represents an aspect of the hash tag. In one example approach, the number is a reflection of popularity (e.g., the rank of the hash tag in the database of hash tags (a lower number is better) or the frequency at which the hash tag is used (a higher number indicates a more popular hash tag)). In another example approach, the number is a reflection of trending (e.g., a number showing how far up or down the list the particular hash tag has moved over a particular period).

In some approaches, smart phone 4 performs some image processing and descriptor extraction and transfers both the image and the results of the some image processing and descriptor extraction to wireless docking center 6. In one example approach, wireless docking center 6 performs additional processing on the acquired image to extract further attributes and then queries the hash tag database to find hash tags relevant to the image. Wireless docking center returns a list of hash tags to the user on the smart phone, the user selects the hash tags to use, and publishes the image with the selected hash tags.

The above noted techniques for attaching hash tags to images speed up the generation of hash tags for images and enhance the value of each hash tag. Each hash tag is a function of an object in the image. In addition, each hash tag is prescreened to verify its value as, for instance a trending hash tag or a currently popular hash tag. The attaching of higher value hash tags to the image should generate more views than the usual method of attaching hash tags. Finally, the user would avoid the use of useless hash tags. That is, hash tags that are never searched on or that are the result of common misspellings.

Various techniques have been described in this disclosure, including techniques consistent with the examples above.

EXAMPLE 1

A method comprising: acquiring, by a wireless dockee (WD), an image; initiating a wireless connection between the wireless dockee (WD) and a wireless docking center (WDC) having one or more peripherals; determining attributes associated with the acquired image, wherein the attributes include feature descriptors; receiving, at the WD and from the WDC, information representative of matching items stored on one or more of the peripherals, wherein the matching items include images with attributes similar to the attributes associated with the acquired image; selecting, at the WD and as a function of the information representative of the matching items, one or more of the matching items; and receiving, from the one or more of the peripherals, the selected matching items.

EXAMPLE 2

The method of example 1, wherein the WD includes a camera and wherein acquiring an image includes capturing the image with the camera.

EXAMPLE 3

The method of examples 1 or 2, wherein receiving the selected matching items includes displaying the selected matching items to a user.

EXAMPLE 4

The method of examples 1, 2 or 3, wherein one or more of the peripherals are configured as peripheral functions (PFs); wherein the WD is configured to provide: a docking service; an application service platform (ASP); and one or more peripheral services, wherein each peripheral service communicates with at least one PF of the one or more PFs associated with the WDC; and wherein selecting one or more of the matching items includes: displaying, via the ASP, some or all of the information representative of one or more of the matching items; receiving, via the ASP, user input indicating the selected matching items; and wherein receiving the selected matching items includes retrieving the selected matching items from their PFs via their corresponding peripheral services.

EXAMPLE 5

The method of examples 1, 2, 3 or 4, wherein determining attributes associated with the acquired image includes extracting image features on the WD and sending the extracted image features to the WDC.

EXAMPLE 6

The method of examples 1, 2, 3, 4 or 5, wherein determining attributes associated with the acquired image includes extracting descriptors of the acquired image and submitting the extracted descriptors to the WDC.

EXAMPLE 7

The method of examples 1, 2, 3, 4, 5, or 6, wherein selecting matching items includes: displaying, on the WD, indicia representing one or more of the matching items found by the WDC to have images with attributes similar to the acquired image; and receiving, at the WD, user input indicating the matching items to be retrieved from the one or more matching items found by the WDC.

EXAMPLE 8

The method of examples 1, 2, 3, 4, 5, 6, or 7, wherein displaying indicia representing one or more of the matching items found by the WDC to have images with attributes similar to the acquired image includes augmenting one or more image features in the indicia.

EXAMPLE 9

The method of examples 1, 2, 3, 4, 5, 6, 7, or 8, wherein determining attributes includes transmitting the acquired image to the WDC for attribute extraction; and wherein selecting matching items includes: displaying, on the WD, indicia representing one or more of the matching items found by the WDC to have images with attributes similar to the acquired image; and receiving, at the WD, user input indicating the matching items to be retrieved from the one or more matching items found by the WDC.

EXAMPLE 10

The method of examples 1, 2, 3, 4, 5, 6, 7, 8, or 9, wherein the information representative of matching items includes hash tags associated with one or more of the attributes.

EXAMPLE 11

The method of examples 1, 2, 3, 4, 5, 6, 7, 8, 9 or 10, wherein the hash tags are limited to popular hash tags.

EXAMPLE 12

The method of examples 1, 2, 3, 4, 5, 6, 7, 8, 9, 10 or 11, wherein the hash tags are limited to trending hash tags.

EXAMPLE 13

A wireless dockee (WD) comprising: a memory; one or more processors; a docking service module executable by the one or more processors to perform a plurality of operations to wirelessly dock with a wireless docking center (WDC) such that the WD may access one or more peripheral functions (PFs) associated with the WDC; one or more peripheral service modules executable by the one or more processors, wherein each peripheral service module corresponds to at least one PF of the one or more PFs associated with the WDC; and an application service platform (ASP) module, wherein the ASP module is executable by the one of more processors to acquire an image, to determine attributes associated with the acquired image, to receive, from the WDC, information representative of matching items stored on one or more of the PFs, wherein the matching items include images with attributes similar to the attributes associated with the acquired image, to select, as a function of the information representative of the items, one or more of the matching items, and to receive the selected matching items when retrieved from the corresponding PFs.

EXAMPLE 14

The WD of example 13, wherein the docking service module is executable by the one or more processors to seek a corresponding docking service of the WDC, to determine the one or more PFs associated with the WDC and to establish a docking session via a direct wireless connection between the WD and the WDC.

EXAMPLE 15

The WD of examples 13 or 14, wherein the docking service module is executable by the one or more processors to trigger a peripheral service of the one or more peripheral services of the WD to use a corresponding peripheral service of the WDC and to configure the peripheral service for use by the WD.

EXAMPLE 16

The WD of example 13, wherein the WD further comprises a camera and wherein the ASP module is executable by the one or more processors to acquire an image via the camera.

EXAMPLE 17

A non-transitory computer-readable storage medium stores instructions that, when executed, cause one or more processors of a wireless dockee (WD) to: acquire an image; initiate a wireless connection between the WD and a wireless docking center (WDC) having one or more peripheral functions (PFs); determine attributes associated with the acquired image; receive, from the WDC, information representative of matching items stored on one or more of the PFs, wherein the matching items include images with attributes similar to the attributes associated with the acquired image; select, as a function of the information representative of the matching items, one or more of the matching items; and receive the selected matching items.

EXAMPLE 18

A method comprising: connecting a wireless docking center (WDC) to one or more peripherals; docking a wireless dockee (WD) to the WDC via a wireless interface, wherein docking includes connecting one or more peripherals to peripheral services on the WD; receiving, from the WD, information representative of an acquired image; determining, at the WDC and based on the information, if there are items on the one or more peripherals with images similar to the acquired image; returning to the WD a list of one or more items with images similar to the acquired image; receiving, from the WD, an indication of items selected from the list; retrieving the selected items from one or more of the peripherals; and transmitting the retrieved selected items to the WD.

EXAMPLE 19

The method of example 18, wherein the information representative of an acquired image includes the acquired image.

EXAMPLE 20

The method of examples 18 or 19, wherein the information representative of an acquired image includes attributes of the acquired image.

EXAMPLE 21

The method of examples 18, 19 or 20, wherein the information representative of an acquired image includes attributes of the acquired image, wherein the attributes include vocabulary indices.

EXAMPLE 22

The method of example 21, wherein determining if there are items on the one or more peripherals with images similar to the acquired image includes applying the vocabulary indices.

EXAMPLE 23

The method of example 21, wherein docking the WD to the WDC includes one or more of: advertising a docking service of the WDC to the WD; and establishing a docking session via a direct wireless connection between the WD and the WDC.

EXAMPLE 24

A non-transitory computer-readable storage medium stores instructions that, when executed, cause one or more processors of a wireless docking center (WDC) to: host a docking service; host an application service platform (ASP); host one or more peripheral services that each correspond to at least one peripheral of the one or more peripherals associated with the WDC; wirelessly docking with a wireless dockee (WD), wherein wirelessly docking includes connecting one or more of the peripherals to peripheral services on the WD; receive, from the WD, information representative of an acquired image; determine, based on the information, if there are items on the one or more peripherals with images similar to the acquired image; return to the WD a list of one or more items with images similar to the acquired image; receive, from the WD, an indication of items selected from the list: retrieve the selected items from one or more of the peripherals; and transmit the retrieved selected items to the WD.

EXAMPLE 25

A method, comprising: identifying objects within a plurality of images, wherein identifying includes assigning one or more descriptors to each object and saving each object and its descriptors in an image object dictionary; assigning attributes to the objects; analyzing an image to determine whether objects from the image object dictionary are present in the image; adding descriptors to the objects; and adding, to an attribute of an object, first hand derived information relevant to the object in the image.

EXAMPLE 26

The method of example 25, wherein the method further comprises assigning a second rank descriptor to the image.

EXAMPLE 27

The method of examples 25 or 26, wherein the method further comprises selecting hash tags relevant to the image, wherein selecting includes comparing one or more of the descriptors to a list of hash tags and noting similar hash tags.

EXAMPLE 28

The method of examples 25, 26 or 27, wherein noting similar hash tags includes recognizing hash tags with meanings that are similar to the one or more descriptors.

EXAMPLE 29

The method of examples 25, 26, 27 or 28, wherein comparing one or more of the descriptors to a list of hash tags includes accumulating a list of trending hash tags and comparing the one or more descriptors to the list of trending or popular hash tags.

EXAMPLE 30

The method of examples 25, 26, 27, 28 or 29, wherein analyzing an image includes: acquiring, by a wireless dockee (WD), the image; and wherein assigning second hand derived information includes: initiating a wireless connection between the wireless dockee (WD) and a wireless docking center (WDC) having one or more peripheral functions (PFs); receiving, at the WD and from the WDC, the image dictionary; and assigning to one or more objects in the acquired image the descriptor assigned to a similar object in the image object dictionary.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM. EEPROM. CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discreet logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   acquiring, by a wireless dockee (WD), an image;
   initiating a wireless connection between the wireless dockee (WD) and a wireless docking center (WDC) having one or more peripherals configured as peripheral functions (PFs), wherein initiating the wireless connection comprises:
      determining, by the WD, the one or more peripherals associated with the WDC based on the WDC and the WD exchanging communications and the WDC executing one or more peripheral service modules on one or more processors of the WDC; and
      selecting at least one peripheral of the one or more peripherals subsequent to the determination;
   setting up one or more peripheral services, wherein each peripheral service establishes a connection for communication with at least one PF of the one or more PFs associated with the WDC, wherein each peripheral service corresponds to one or more of the one or more PFs and is used to establish a connection for communication with the one or more of the one or more PFs with which each respective peripheral service corresponds;
   determining attributes associated with the acquired image, wherein the attributes include feature descriptors;
   receiving, at the WD and from the WDC, information representative of matching items stored on at least one peripheral of the at least one selected peripheral based on the connection established by the one or more peripheral services, wherein the matching items include images with attributes similar to the attributes associated with the acquired image, wherein the information representative of the matching items comprises one of indicia representing one or more of documents detected by the WDC via a search of the at least one peripheral or information representative of a searchable database selected by the WDC;
   selecting, at the WD and as a function of the information representative of the matching items, one or more of the matching items; and
   receiving, from the one or more of the peripherals, the selected matching items.

2. The method of claim 1, wherein the WD includes a camera and wherein acquiring an image includes capturing the image with the camera.

3. The method of claim 1, wherein receiving the selected matching items includes displaying the selected matching items to a user.

4. The method of claim 1,
   wherein the WD is configured to provide:
      a docking service;
      an application service platform (ASP); and
      wherein selecting one or more of the matching items includes:
         displaying, via the ASP, some or all of the information representative of one or more of the matching items;
   receiving, via the ASP, user input indicating the selected matching items.

5. The method of claim 1, wherein determining the attributes associated with the acquired image includes extracting image features on the WD and sending the extracted image features to the WDC.

6. The method of claim 1, wherein determining the attributes associated with the acquired image includes extracting descriptors of the acquired image and submitting the extracted descriptors to the WDC.

7. The method of claim 1, wherein selecting matching items includes:
   displaying, on the WD, indicia representing one or more of the matching items found by the WDC to have images with attributes similar to the acquired image; and
   receiving, at the WD, user input indicating the matching items to be retrieved from the one or more matching items found by the WDC.

8. The method of claim 7, wherein displaying indicia representing one or more of the matching items found by the WDC to have images with attributes similar to the acquired image includes augmenting one or more image features in the indicia.

9. The method of claim 1, wherein determining the attributes includes transmitting the acquired image to the WDC for attribute extraction; and
   wherein selecting matching items includes:
      displaying, on the WD, indicia representing one or more of the matching items found by the WDC to have images with attributes similar to the acquired image; and
      receiving, at the WD, user input indicating the matching items to be retrieved from the one or more matching items found by the WDC.

10. The method of claim 1, wherein the information representative of matching items includes hash tags associated with one or more of the attributes.

11. The method of claim 10, wherein the hash tags are limited to hash tags identified in one or more websites.

12. A wireless dockee (WD) comprising:
a memory configured to store a docking service module, one or more peripheral service modules, and an application service platform (ASP) module; and
one or more processors configured to:
execute the docking service module to perform a plurality of operations to wirelessly dock with a wireless docking center (WDC) such that the WD is configured to access one or more peripheral functions (PFs), of one or more peripherals, associated with the WDC and select at least one PF of the one or more PFs, wherein to perform the plurality of operations, the one or more processors are configured to:
determine the one or more peripherals associated with the WDC based on the WDC and the WD exchanging communications and the WDC executing one or more peripheral service modules on one or more processors of the WDC; and
select at least one peripheral of the one or more peripherals subsequent to the determination;
execute one or more of the one or more peripheral service modules to setup one or more peripheral services, wherein each peripheral service establishes a connection for communication with at least one PF of the one or more PFs associated with the WDC, wherein each peripheral service corresponds to one or more of the one or more PFs and is used to establish a connection for communication with the one or more of the one or more PFs with which each respective peripheral service corresponds; and
execute the ASP module to acquire an image to receive, from the WDC, information representative of matching items stored on at least one PF of the at least one selected PF based on the connection established by the one or more peripheral services, wherein the information representative of the matching items comprises one of indicia representing one or more of documents detected by the WDC via a search of the at least one peripheral or information representative of a searchable database selected by the WDC, wherein the matching items include images with attributes similar to the attributes associated with the acquired image, to select, as a function of the information representative of the items, one or more of the matching items, and to receive the selected matching items when retrieved from the corresponding PFs.

13. The WD of claim 12, wherein the docking service module is executable by the one or more processors to seek a corresponding docking service of the WDC, to determine the one or more PFs associated with the WDC and to establish a docking session via a direct wireless connection between the WD and the WDC.

14. The WD of claim 12, wherein the docking service module is executable by the one or more processors to trigger a peripheral service of the one or more peripheral services of the WD to use a corresponding peripheral service of the WDC and to configure the peripheral service for use by the WD.

15. The WD of claim 12, wherein the WD further comprises a camera and wherein the ASP module is executable by the one or more processors to acquire an image via the camera.

16. A non-transitory computer-readable storage medium stores instructions that, when executed, cause one or more processors of a wireless dockee (WD) to:
acquire an image;
initiate a wireless connection between the WD and a wireless docking center (WDC) having one or more peripheral functions (PFs) of one or more peripherals, wherein the instructions that cause the one or more processors to initiate the wireless connection comprise instructions that cause the one or more processors to:
determine the the one or more peripherals associated with the WDC based on the WDC and the WD exchanging communications and the WDC executing one or more peripheral service modules on one or more processors of the WDC; and
select at least one PF of the one or more PFs subsequent to the determination;
set up one or more peripheral services, wherein each peripheral service establishes a connection for communication with at least one PF of the one or more PFs associated with the WDC, wherein each peripheral service corresponds to one or more of the one or more PFs and is used to establish a connection for communication with the one or more of the one or more PFs with which each respective peripheral service corresponds;
determine attributes associated with the acquired image;
receive, from the WDC, information representative of matching items stored on at least one PF of the at least one selected PF based on the connection established by the one or more peripheral devices, wherein the matching items include images with attributes similar to the attributes associated with the acquired image, wherein the information representative of the matching items comprises one of indicia representing one or more of documents detected by the WDC via a search of the at least one peripheral or information representative of a searchable database selected by the WDC;
select, as a function of the information representative of the matching items, one or more of the matching items; and
receive the selected matching items.

17. A method comprising:
docking a wireless dockee (WD) to a wireless docking center (WDC) via a wireless interface, wherein docking includes:
initiating a wireless connection between the WD and the WDC having one or more peripherals configured as peripheral functions (PFs), wherein initiating the wireless connection comprises:
determine, by the WD, the one or more peripherals associated with the WDC based on the WDC and the WD exchanging communications and the WDC executing one or more peripheral service modules on one or more processors of the WDC; and
selecting at least one peripheral of the one or more peripherals subsequent to the determination; and
setting up communication between one or more peripherals selected by the WD and associated with the WDC, and one or more peripheral services executing on a processor of the WD, wherein each peripheral service establishes a connection for communication with at least one peripheral of the one or more peripherals associated with the WDC based on the WDC executing the one or more peripheral service modules, wherein each peripheral service corresponds to one or more of the one or more peripherals and is used to establish a connection for communication with the one or more of the one or more peripherals with which each respective peripheral service corresponds;

receiving, from the WD, information representative of an acquired image;

determining, at the WDC and based on the information, if there are items on the selected one or more peripherals with images similar to the acquired image, wherein determining if there are items on the selected one or more peripherals comprises:
　determining, with the WDC, information representing one or more of documents detected by the WDC via a search of the one or more peripherals or information representative of a searchable database selected by the WDC;

returning to the WD a list of one or more items with images similar to the acquired image;

receiving, from the WD, an indication of items selected from the list;

retrieving the selected items from one or more of the peripherals; and transmitting the retrieved selected items to the WD.

18. The method of claim 17, wherein the information representative of an acquired image includes the acquired image.

19. The method of claim 17, wherein the information representative of an acquired image includes attributes of the acquired image.

20. The method of claim 17, wherein the information representative of an acquired image includes attributes of the acquired image, wherein the attributes include vocabulary indices.

21. The method of claim 20, wherein determining if there are items on the one or more peripherals with images similar to the acquired image includes applying the vocabulary indices.

22. The method of claim 20, wherein docking the WD to the WDC includes one or more of:
　advertising a docking service of the WDC to the WD; and
　establishing a docking session via a direct wireless connection between the WD and the WDC.

23. A non-transitory computer-readable storage medium stores instructions that, when executed, cause one or more processors of a wireless docking center (WDC) to:
　host a docking service to wirelessly dock with a wireless dockee (WD), wherein the instructions that cause the docking service to wirelessly dock comprise instructions that cause the one or more processors of the WDC to determine one or more peripherals associated with the WDC based on the WDC and the WD exchanging communications and the WDC executing one or more peripheral service modules on one or more processors of the WDC;
　host an application service platform (ASP);
　host one or more WDC peripheral services that each correspond to at least one peripheral of one or more peripherals selected by the WD and associated with the WDC to set up communication between the one or more peripherals associated with the WDC, and one or more WD peripheral services executing on a processor of the WD, wherein each peripheral service on the WD establishes a connection for communication with at least one peripheral of the one or more peripherals associated with the WDC, wherein each peripheral service corresponds to one or more of the one or more peripherals and is used to establish a connection for communication with the one or more of the one or more peripherals with which each respective peripheral service corresponds;

receive, from the WD, information representative of an acquired image;

determine, based on the information, if there are items on the selected one or more peripherals with images similar to the acquired image, wherein the instructions that cause the one or more processors of the WDC to determine if there are items on the selected one or more peripherals comprise instructions that cause the one or more processors of the WDC to:
　determine information representing one or more of documents detected by the WDC via a search of the one or more peripherals or information representative of a searchable database selected by the WDC;

return to the WD a list of one or more items with images similar to the acquired image;

receive, from the WD, an indication of items selected from the list;

retrieve the selected items from one or more of the peripherals; and transmit the retrieved selected items to the WD.

24. A method comprising:
receiving information identifying objects within a plurality of images, wherein the information identifying the objects includes assignment of one or more descriptors to each object;

saving each object and its descriptors in an image object dictionary;

receiving information of assignment of attributes to the objects;

analyzing an image to determine whether objects from the image object dictionary are present in the image, wherein analyzing the image includes acquiring, by a wireless dockee (WD), the image;

receiving information for adding descriptors to the objects;

receiving information for adding, to an attribute of an object, first hand derived information relevant to the object in the image;

receiving information for assigning a second rank descriptor to the image, wherein receiving information for assigning the second rank descriptor to the image includes:
　initiating a wireless connection between the wireless dockee (WD) and a wireless docking center (WDC) having one or more peripheral functions (PFs), wherein initiating the wireless connection comprises:
　　determining, by the WD, the one or more peripherals associated with the WDC based on the WDC and the WD exchanging communications and the WDC executing one or more peripheral service modules on one or more processors of the WDC, and
　　selecting at least one peripheral of the one or more peripherals subsequent to the determination;
　receiving, at the WD and from the WDC, the image dictionary; and receiving information for assigning to one or more objects in the acquired image the descriptor assigned to a similar object in the image object dictionary; and selecting hash tags relevant to the image, wherein selecting includes comparing one or more of the descriptors to a list of hash tags and noting similar hash tags.

25. The method of claim 24, wherein noting similar hash tags includes recognizing hash tags with meanings that are similar to the one or more descriptors.

26. The method of claim 24, wherein comparing one or more of the descriptors to a list of hash tags includes accumulating a list of trending or popular hash tags identified in one or more websites and comparing the one or more descriptors to the list of trending or popular hash tags.

* * * * *